United States Patent
Saito et al.

(10) Patent No.: US 9,928,414 B2
(45) Date of Patent: Mar. 27, 2018

(54) INFORMATION PROCESSING SYSTEM FOR DISPLAYING HANDWRITING ACTION TRAJECTORY BASED ON META INFORMATION

(71) Applicant: SONY CORPORATION, Tokyo (JP)

(72) Inventors: Makoto Saito, Tokyo (JP); Hiroaki Kitano, Saitama (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 14/606,700

(22) Filed: Jan. 27, 2015

(65) Prior Publication Data

US 2015/0220797 A1   Aug. 6, 2015

(30) Foreign Application Priority Data

Feb. 6, 2014   (JP) .................. 2014-021480

(51) Int. Cl.
| | | |
|---|---|---|
| G06K 9/00 | (2006.01) | |
| G06F 3/00 | (2006.01) | |
| G06F 3/023 | (2006.01) | |
| G06F 3/0488 | (2013.01) | |

(52) U.S. Cl.
CPC ........ G06K 9/00402 (2013.01); G06F 3/0237 (2013.01); G06F 3/04883 (2013.01); G06K 9/00416 (2013.01); G06K 9/00865 (2013.01); G06F 2203/0381 (2013.01); G06K 2209/01 (2013.01); G06K 2209/27 (2013.01)

(58) Field of Classification Search
CPC .......... G06K 9/00402; G06K 2209/27; G06K 2209/01
See application file for complete search history.

(56) References Cited

U.S. PATENT DOCUMENTS

| | | | | |
|---|---|---|---|---|
| 5,113,452 A | * | 5/1992 | Chatani | G06K 9/222 382/177 |
| 5,768,417 A | * | 6/1998 | Errico | G06K 9/00865 382/122 |
| 5,960,124 A | * | 9/1999 | Taguchi | G06K 9/24 382/284 |
| 7,110,576 B2 | * | 9/2006 | Norris, Jr. | G07B 17/00435 178/19.01 |
| 2007/0025618 A1 | * | 2/2007 | Lin | G06K 9/00416 382/186 |
| 2009/0251338 A1 | * | 10/2009 | Marggraff | G06K 9/228 341/20 |
| 2011/0111775 A1 | * | 5/2011 | Kim | H04M 1/72552 455/466 |
| 2012/0020562 A1 | * | 1/2012 | Vojak | G06K 9/2063 382/182 |
| 2014/0152543 A1 | * | 6/2014 | Hirabayashi | G06F 3/1462 345/156 |

(Continued)

FOREIGN PATENT DOCUMENTS

JP   2003-248548 A   9/2003

Primary Examiner — Utpal Shah
(74) Attorney, Agent, or Firm — Chip Law Group

(57) ABSTRACT

There is provided an information processing system including a first control unit configured to associate handwriting action trajectory information indicating a user's handwriting action trajectory with meta information capable of being detected from an actual environment where the user's handwriting action is performed.

20 Claims, 24 Drawing Sheets

(56) References Cited

U.S. PATENT DOCUMENTS

| | | | |
|---|---|---|---|
| 2014/0245119 A1* | 8/2014 | Barrus | G06F 17/243 715/224 |
| 2014/0258830 A1* | 9/2014 | Gormish | G06F 17/243 715/226 |
| 2015/0062043 A1* | 3/2015 | Kim | G06F 3/04883 345/173 |
| 2015/0116283 A1* | 4/2015 | Black | G06K 9/00416 345/179 |
| 2015/0154443 A1* | 6/2015 | Ookawara | G06F 17/2247 715/234 |
| 2015/0339051 A1* | 11/2015 | Yang | G06F 3/04883 382/189 |

* cited by examiner

ABCDEFG···············

2013
3/2
12:00~
13:00

HIJKLMNOP·········

2013
3/2
14:00~
15:00

QRSTYVW···············

30i

| 320 | 330 |
|---|---|
| TOKYO OTA-KU ..... | ABCDEFG·················· ················· ················· |
| TOKYO SHINAGAWA-KU ..... | HIJKLMNOP············ ················· ················· |
| TOKYO MINATO-KU ..... | QRSTVW················ ················· ················· |

30i 400
410   30i

INFORMATION PROCESSING SYSTEM FOR DISPLAYING HANDWRITING ACTION TRAJECTORY BASED ON META INFORMATION

CROSS REFERENCE TO RELATED APPLICATIONS

This application claims the benefit of Japanese Priority Patent Application JP 2014-021480 filed Feb. 6, 2014, the entire contents of which are incorporated herein by reference.

BACKGROUND

The present disclosure relates to an information processing system, an information processing method, and a program.

JP 2003-248548A discloses an information processing apparatus that displays a trajectory of a handwriting action performed by a user.

SUMMARY

However, the technology disclosed in JP 2003-248548A did not impart any meta information to a handwriting action trajectory. For this reason, there is a limitation to applications of the handwriting action trajectory.

Therefore, a technology that can impart meta information to handwriting action trajectory information is sought after.

According to an embodiment of the present disclosure, there is provided an information processing system including a first control unit configured to associate handwriting action trajectory information indicating a user's handwriting action trajectory with meta information capable of being detected from an actual environment where the user's handwriting action is performed.

According to an embodiment of the present disclosure, there is provided an information processing method including associating handwriting action trajectory information indicating a user's handwriting action trajectory with meta information capable of being detected from an actual environment where the user's handwriting action is performed.

According to an embodiment of the present disclosure, there is provided a program for causing a computer to execute a first control function of associating handwriting action trajectory information indicating a user's handwriting action trajectory with meta information capable of being detected from an actual environment where the user's handwriting action is performed.

According to one or more embodiments of the present disclosure, the meta information can be imparted to the handwriting action trajectory information.

According to the embodiments of the present disclosure described above, the meta information can be imparted to the handwriting action trajectory information. The technology according to the present disclosure may have the effect described in the present specification, or other effects.

BRIEF DESCRIPTION OF THE DRAWINGS

FIG. 31 is an explanatory diagram illustrating an example of a screen displayed by the information processing system;

DETAILED DESCRIPTION OF THE EMBODIMENT(S)

Figure 1:
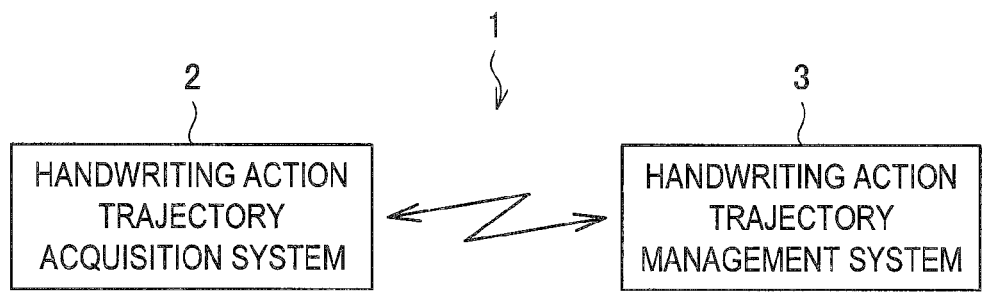
FIG. 1 is a block diagram illustrating an entire configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order:
1. Configuration of information processing system
　1.1 Entire configuration
　1.2 Configuration of handwriting action trajectory acquisition system
　　1-2-1. First example
　　1-2-2. Second example
　　1-2-3. Third example
　1.3 Configuration of handwriting action trajectory management system
　　1-3-1. First example
　　1-3-2. Second example
2. Processing by information processing system
　2-1. Basic processing
　2-2. Searching process
　2-2-1. Searching processing based on time information
　2-2-2. Searching processing based on geographic information
　2-2-3. Searching processing based on text information (character recognition information)
　2-3. Sequential reproduction processing of unit trajectory
　2-4. Correction processing of handwriting action trajectory information
　2-5. Command correspondence processing
　2-6. Command execution processing
　2-7. ID imparting processing
　2-8. ID collation processing
　<1. Configuration of Information Processing System>
　(1.1. Entire Configuration)

First, an entire configuration of an information processing system 1 according to the present embodiment will be described with reference to FIG. 1. The information processing system 1 includes a handwriting action trajectory acquisition system 2 and a handwriting action trajectory management system 3. The handwriting action trajectory acquisition system 2 is a system that associates handwriting action trajectory information indicating a user's handwriting action trajectory and meta information that can be detected from an actual environment where the user's handwriting action is performed.

Here, the handwriting action trajectory is a trajectory drawn by a user's handwriting action. The handwriting action may be performed using a writing implement, or may be performed without using a writing implement. The writing implement may be what enables you to draw the writing action trajectory (character, symbol, painting, or the like) in itself, or may have no function of drawing the handwriting action trajectory in self. Examples of the former may include a pencil, a sharp pencil, a ballpoint pen, a fountain pen, a brush, a marker, and the like. Examples of the latter may include a touch pen and the like. Examples of the handwriting action performed without using the writing implement may include various gesture actions (for example, an action of moving a finger) and the like. The handwriting action trajectory management system 3 is a system that performs a variety of processing for handwriting action trajectory information based on meta information.

(1.2. Configuration of Handwriting Action Trajectory Acquisition System)

The handwriting action trajectory acquisition system 2 is a system that associates the handwriting action trajectory information (more specifically, individual stroke information constituting the handwriting action trajectory information) and the meta information, but several systems may be taken as that example. Hereinafter, examples of the handwriting action trajectory acquisition system 2 will be sequentially described.

1-2-1. First Example

Figure 2:
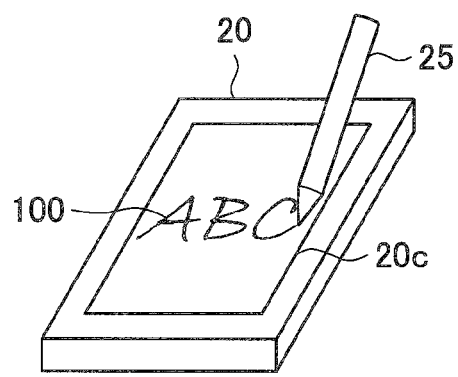
FIG. 2 is an explanatory diagram illustrating an example of a handwriting action trajectory acquisition system according to the embodiment.
Figure 5:
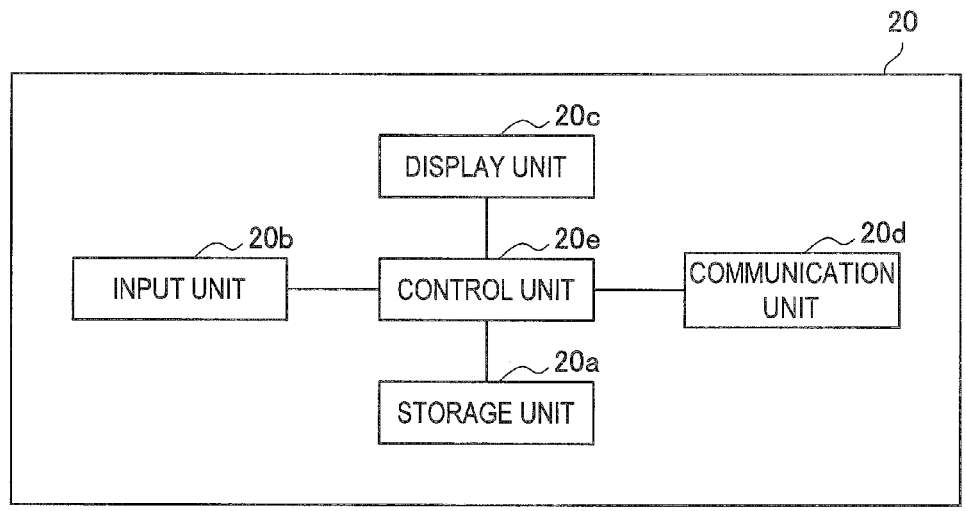
FIG. 5 is a block diagram illustrating an example of a handwriting action trajectory acquisition system.

First, a first example will be described with reference to FIGS. 2, 5, and 6. A handwriting action trajectory acquisition system 2 according to a first example includes an information processing apparatus 20.

The information processing apparatus 20 is a so-called electronic display. As illustrated in FIG. 5, the information processing apparatus 20 includes a storage unit 20a, an input unit 20b, a display unit 20c, a communication unit 20d, and a control unit 20e (first control unit). The storage unit 20a stores a variety of meta information as well as programs necessary for processing that is performed by the information processing apparatus 20. Also, the storage unit 20a stores handwriting action trajectory information and meta information in association with each other. Details of the meta information will be described below. A device that stores the handwriting action trajectory information and the meta information may be detachably attached to the information processing apparatus 20.

The input unit 20b receives the user's handwriting action and is, for example, a touchscreen. The input unit 20b detects the handwriting action trajectory drawn by the user's handwriting action (for example, handwriting action trajectory 100 illustrated in FIG. 2) and outputs the handwriting action trajectory information about the handwriting action trajectory to the control unit 20e. In the first example, the user performs the handwriting action by pressing and moving the writing implement 25 (specifically, touch pen) on the input unit 20b.

Figure 11:
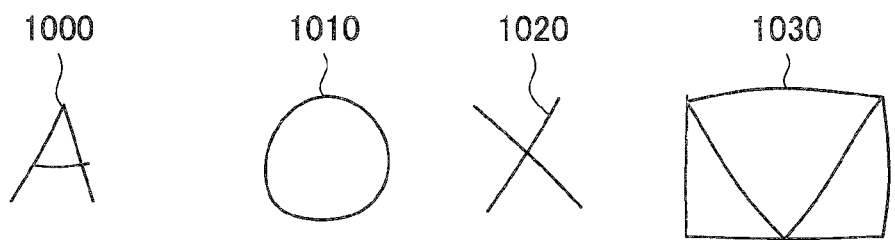
FIG. 11 is an explanatory diagram illustrating an example of a handwriting action trajectory information.

The handwriting action trajectory information is, for example, information indicating xy coordinates of each point constituting the handwriting action trajectory (hereinafter, referred to as "stroke constituting point". The xy coordinates of the first example be may any xy coordinates that are set in advance to a touchscreen 20h. Examples of the handwriting action trajectory are illustrated in FIG. 11. In FIG. 11, handwriting action trajectories 1000 to 1030 are illustrated as the examples of the handwriting action trajectory. As illustrated in FIG. 11, the examples of the handwriting action trajectory may include various characters (alphabet or the like), symbols, and the like. The display unit 20*c* displays a variety of information, for example, a user's handwriting action trajectory. The communication unit 20*d* transmits a variety of information to the handwriting action trajectory management system 3. Examples of the information may include the handwriting action trajectory information (more specifically, stroke information to be described below) and the meta information associated with the handwriting action trajectory information.

The control unit 20*e* performs the following processing as well as the control of the various structural elements included in the information processing apparatus 20. The control unit 20*e* divides the handwriting action trajectory into one or more unit trajectories (hereinafter, referred to as "strokes"). For example, the control unit 20*e* sets one stroke as a trajectory drawn by the writing implement 25 from a contact with an object to a separation from the object. Here, the object is an object of the handwriting action, that is, a base material on which the handwriting action trajectory such as character is drawn. In a case where the user performs a gesture within a space, for example, a plane in which the user's fingertip moves may be set as the object. Also, a plane (for example, display panel surface) that intersects with an extension line of a user's fingertip may be set as the object. In this case, a trajectory of an intersection point between the extension line of the user's fingertip and the plane is the handwriting action trajectory. The handwriting action trajectory by the gesture may be detected by, for example, a second example to be described below. The control unit 20*e* may detect a user state (standing, sitting, on a train, or the like) by using a gyro sensor or the like, and correct the handwriting action trajectory based on the user state. A relationship between the handwriting action trajectory and the stroke will be described with reference to FIG. 12.

Figure 12:
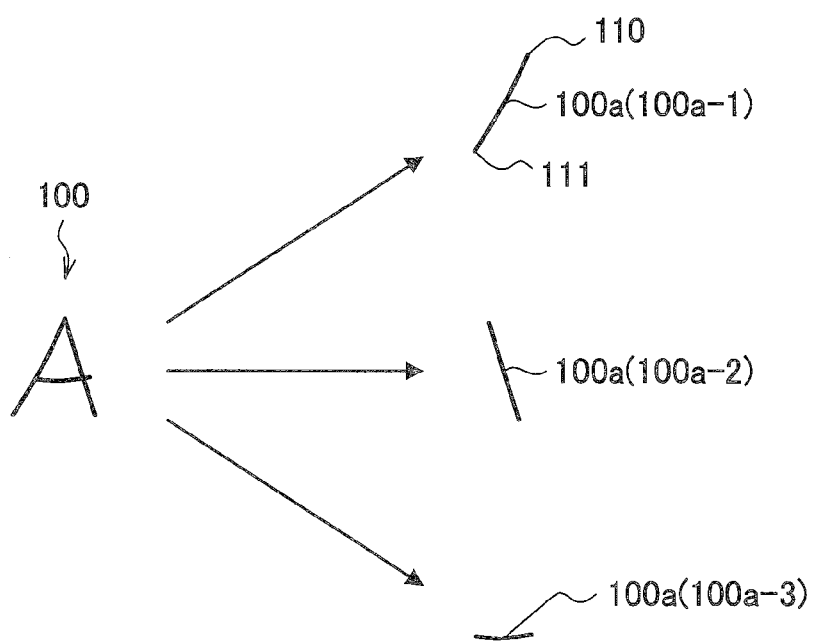
FIG. 12 is an explanatory diagram illustrating an example of unit trajectory information.

FIG. 12 illustrates a handwriting action trajectory 100 that draws an alphabet "A". Strokes 100*a* are individual trajectories that constitute the handwriting action trajectory 100. For example, in a case where the handwriting action trajectory 100 is the alphabet "A", the handwriting action trajectory 100 is divided into three strokes 100*a* (100*a*-1 to 100*a*-3).

The control unit 20*e* imparts meta information to stroke information indicating the respective strokes. Here, the meta information is information that can be detected from an actual environment where the user's handwriting action is performed. Detailed examples of the meta information may include time information, text information (character recognition information), user's biological information, geographic information, writing pressure information, type information of the writing implement, object information, and the like.

The time information is information about time at which the handwriting action has been performed. More specifically, the time information includes a start time at which the stroke has been started and an end time at which the stroke has been ended. For example, in a case where the stroke 100*a*-1 is drawn, a time at which a point 110 has been drawn is the start time, and a time at which a point 111 has been drawn is the end time. The text information is, for example, information in which the handwriting action trajectory codes the character. The control unit 20*e* can acquire the text information, for example, by recognizing the character with respect to the handwriting action trajectory. In each stroke, the text information of the character constituted by the strokes may be imparted as the meta information. For example, in a case where the handwriting action trajectory indicates the alphabet "A", the text information indicating the alphabet "A" may be imparted to each piece of stroke information.

The user's biological information is information acquired from the user's body, for example, a fingerprint, a vein, a user's moving speed, acceleration, or posture, or the like. In the present embodiment, any information capable of identifying the user may be included in the user's biological information. For example, the user's biological information may be the user's name, an ID that uniquely identifies the user, and the like.

The geographic information is information indicating a place where the user's handwriting action has been performed, that is, a write-down place. Examples of the geographic information may include an atmospheric pressure, a temperature, a humidity, a brightness, a wind speed, a photo, a video, an environment sound, or the like of a write-down place, as well as GPS information and location information of wireless communication. The control unit 20*e* may acquire the geographic information by using a sensor that can detect the geographic information.

The pen pressure information indicates a user's writing pressure (here, a pressure that presses the writing implement 25 against the input unit 20*b*). The type information of the writing implement is information indicating a type of the writing implement. The type of the writing implement may be information indicating an actual writing implement and may also be a type designated by the user. For example, in the first example, the actual writing implement is a touch pen, but the user may arbitrarily designate the type of the writing implement. Examples of the type of the writing implement may include a pencil, a sharp pencil, a ballpoint pen, a fountain pen, a brush, a marker, and the like.

The object information indicates a type of an object of the handwriting action, that is, an object (base material) on which the handwriting action trajectory such as character is drawn. Examples of the object may include a paper, a desk, a whiteboard, and a blackboard, as well as the electronic display (more specifically, touchscreen) described in the present example. The object information may include information about a shape, a color, and a size of the object, as well as the type of the object.

It is obvious that the meta information is not limited the above-described information. Examples of other meta information may include color information indicating a color of the handwriting action trajectory, type information indicating a line type of the handwriting action trajectory. The color information may be a color designated by the user as well as a color of an actually drawn handwriting action trajectory. In the first example, since the writing implement is a touch pen, the touch pen itself is not capable of drawing the handwriting action trajectory. Therefore, the user may arbitrarily designate the color of the handwriting action trajectory. On the display unit 20*c*, the handwriting action trajectory is drawn with the color designated by the user. Examples of the color information may include RGB/CMY classification, brightness, and chroma.

The line type information may a line type designated by the user as well as a line type of an actually drawn handwriting action trajectory. In the first example, since the writing implement is a touch pen, the touch pen itself is not capable of drawing the handwriting action trajectory. Therefore, the user may arbitrarily designate the line type of the handwriting action trajectory. On the display unit 20c, the handwriting action trajectory is drawn with the line type designated by the user. Examples of the line type information may include various types of dotted lines, straight lines, circular arcs, broken lines, and the like.

Also, the control unit 20e creates a handwriting action trajectory group by grouping stroke information. The control unit 20e may set one handwriting action trajectory group as one-page stroke information. The page setting method is not particularly limited. For example, a page preset to an electronic display may be a page of the present embodiment. The control unit 20e may impart meta information to the handwriting action trajectory group itself. The type of the meta information is the same as that described above. However, the time information imparted to the handwriting action trajectory group indicates, for example, a creation start time and a creation end time of the handwriting action trajectory group. The creation start time indicates a start time of a stroke drawn at the first time in the stroke information constituting the handwriting action trajectory group. The creation end time indicates an end time of a stroke drawn at the last time in the stroke information constituting the handwriting action trajectory group. Also, the text information imparted to the handwriting action trajectory group indicates all texts constituting the handwriting action trajectory group. The text information imparted to each of the stroke information may indicate all texts constituting the handwriting action trajectory group.

Also, the control unit 20e may impart different meta information (different types of meta information) to each piece of the stroke information and the handwriting action trajectory group. For example, the control unit 20e may impart only time information to each piece of the stroke information and impart a plurality of types of meta information, including time information, to the handwriting action trajectory group. Since the time information is frequently used by the handwriting action trajectory management system 3, it is preferable that at least the time information be imparted to each piece of the stroke information.

Figure 15:
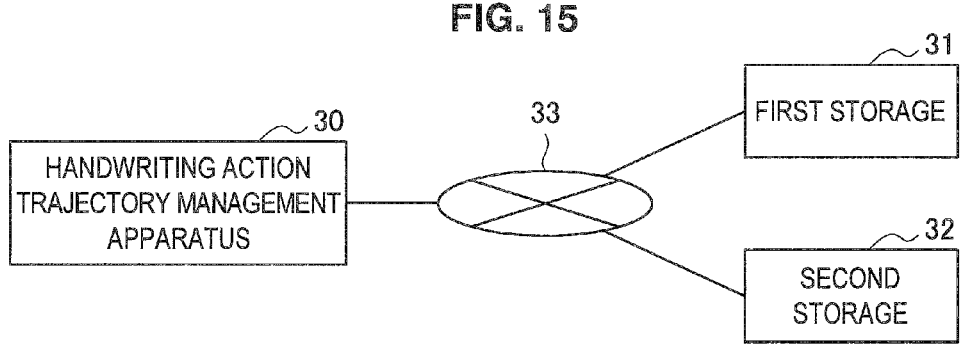
FIG. 15 is an explanatory diagram illustrating an example of the handwriting action trajectory management system.

The control unit 20e outputs the stroke information and the meta information imparted to the stroke information to the communication unit 20d. Also, the control unit 20e outputs the handwriting action trajectory group and the information imparted to the corresponding group to the communication unit 20d. The communication unit 20d transmits such information to the handwriting action trajectory management system 3. The handwriting action trajectory management system 3 stores such information in, for example, a single storage, that is, a handwriting action trajectory management apparatus 30. However, the control unit 20e may impart an integrated ID to the stroke information and the meta information. While storing one (for example, the meta information) of the stroke information and the meta information in the storage unit 20a, the control unit 20e may store the other information (for example, the stroke information) in the handwriting action trajectory management apparatus 30. Also, in a case where the handwriting action trajectory management system 3 includes a plurality of storages 31 and 32 (see FIG. 15), the control unit 20e may store such information in separate storages. The control unit 20e may also perform the same processing on the handwriting action trajectory group. Therefore, the confidentiality of information is improved.

Figure 6:
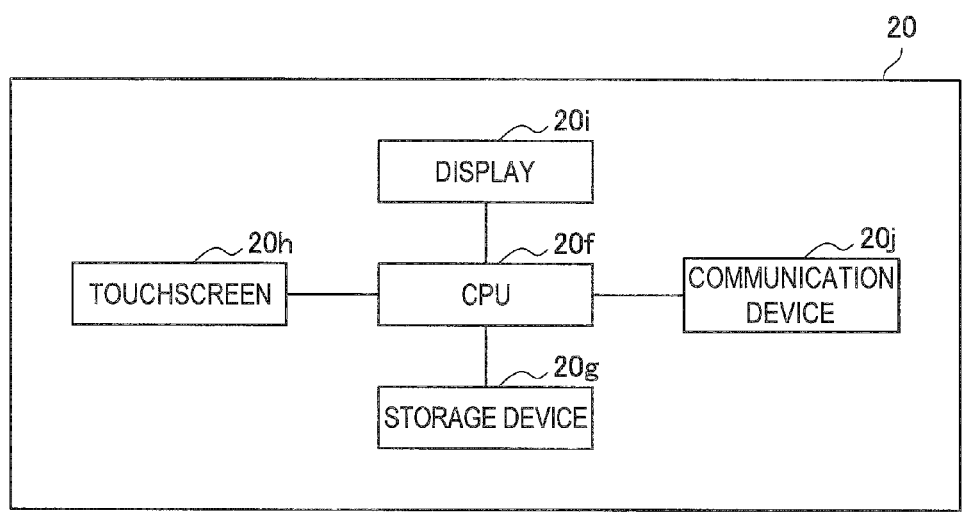
FIG. 6 is a hardware configuration diagram illustrating an example of a handwriting action trajectory acquisition system.

As illustrated in FIG. 6, the information processing apparatus 20 includes a CPU 20f, a storage device 20g, a touchscreen 20h, a display 20i, and a communication device 20j as hardware configurations. By such hardware configurations, the information processing apparatus 20 realizes the storage unit 20a, the input unit 20b, the display unit 20c, the communication unit 20d, and the control unit 20e, which have been described above. Such hardware configurations are realized by electronic circuits or the like.

The CPU 20f reads and executes programs stored in the storage device 20g. The storage device 20g is configured by a ROM, a RAM, a nonvolatile memory, or the like. The storage device 20g stores programs for realizing the storage unit 20a, the input unit 20b, the display unit 20c, the communication unit 20d, and the control unit 20e in the information processing apparatus 20. The storage device 20g stores the stroke information and the meta information in association with each other. The storage device 20g stores the handwriting action trajectory group and the meta information in association with each other. The storage device 20g is also used as a work area by the CPU 20f. The touchscreen 20h detects the handwriting action trajectory. The display 20i displays the handwriting action trajectory or the like. The communication device 20j performs communication with the handwriting action trajectory management system 3.

1-2-2. Second Example

Figure 3:
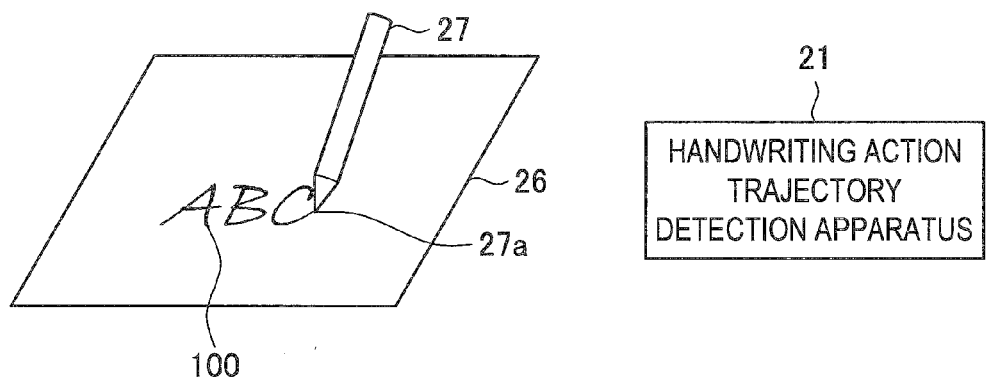
FIG. 3 is an explanatory diagram illustrating an example of a handwriting action trajectory acquisition system.

Next, a second example will be described with reference to FIGS. 3, 7, and 8. A handwriting action trajectory acquisition system 2 according to a second example includes a handwriting action trajectory detection apparatus 21.

The handwriting action trajectory detection apparatus 21 detects a handwriting action trajectory by detecting a movement of a front end 27a of a writing implement 27. Here, the writing implement 27 may be able to draw a handwriting action trajectory or may not be able to draw a handwriting action trajectory. In the example illustrated in FIG. 3, a user uses the writing implement 27 to draw a handwriting action trajectory 100 on a paper (object) 26.

Figure 7:
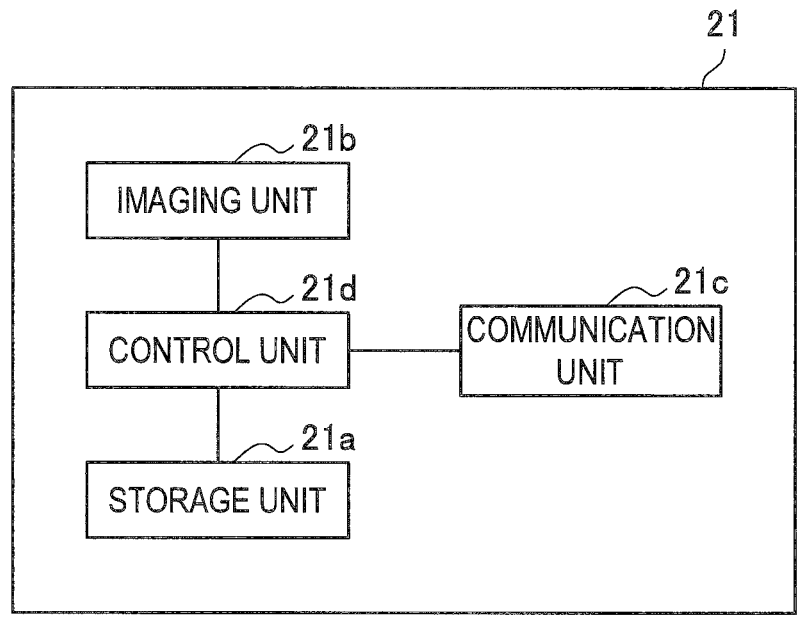
FIG. 7 is a block diagram illustrating an example of a handwriting action trajectory acquisition system.

As illustrated in FIG. 7, the handwriting action trajectory detection apparatus 21 includes a storage unit 21a, an imaging unit 21b, a communication unit 21c, and a control unit 21d (first control unit). The storage unit 21a stores a variety of meta information as well as programs necessary for processing that is performed by the handwriting action trajectory detection apparatus 21. Also, the storage unit 21a stores handwriting action trajectory information and meta information in association with each other. The contents of the meta information are the same as those described above.

Two or more imaging units 21b are provided at different positions and capture the front end 27a of the writing implement 27. Then, the imaging unit 21b outputs captured image information obtained by the capturing to the control unit 21d.

The communication unit 21c performs communication with the handwriting action trajectory management system 3. The control unit 21d performs the same processing as the control unit 20e. However, the control unit 21d generates handwriting action trajectory information based on the captured image information. That is, the control unit 21d defines an xy plane on the paper 26. Then, the control unit 21d defines xy coordinates of the front end 27a, that is, xy coordinates of a stroke configuration point, based on the captured image information and the principle of triangulation. It is obvious that the method of generating the handwriting action trajectory information is not limited thereto. For example, in a case where a specific dot pattern is drawn on a surface of an object, the control unit 21d may specify xy coordinates of each point based on a positional relationship between each point constituting the handwriting action trajectory and the dot pattern. Also, the control unit 21d may divide the paper 26 into one or more pages and include information about strokes drawn in the respective pages in one handwriting action trajectory group.

Figure 8:
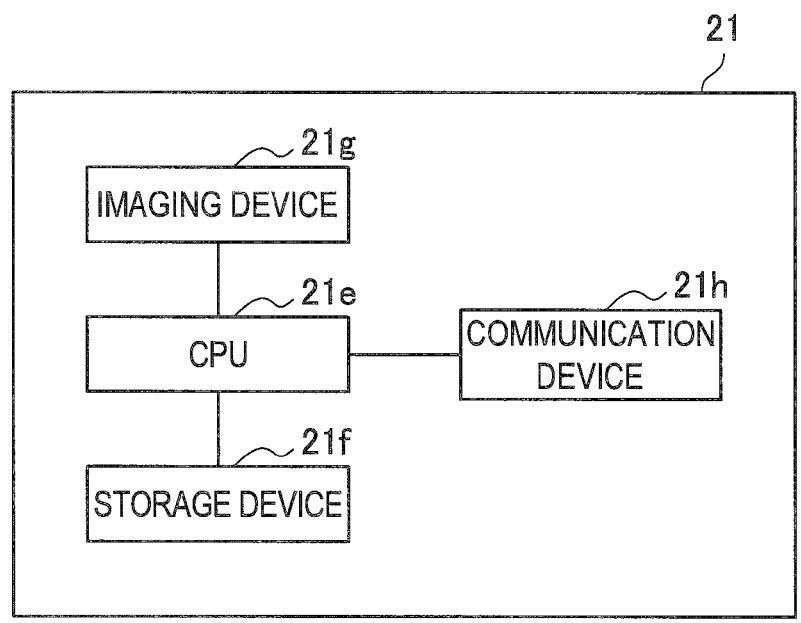
FIG. 8 is a hardware configuration diagram illustrating an example of a handwriting action trajectory acquisition system.

As illustrated in FIG. 8, the handwriting action trajectory detection apparatus 21 includes a CPU 21e, a storage device 21f, an imaging device 21g, and a communication device 21h as hardware configurations. By such hardware configurations, the handwriting action trajectory detection apparatus 21 realizes the storage unit 21a, the imaging unit 21b, the communication unit 21c, and the control unit 21d, which have been described above. Such hardware configurations are realized by electronic circuits or the like.

The CPU 21e reads and executes programs stored in the storage device 21f. The storage device 21f is configured by a ROM, a RAM, a nonvolatile memory, or the like. The storage device 21f stores programs for realizing the storage unit 21a, the imaging unit 21b, the communication unit 21c, and the control unit 21d in the handwriting action trajectory detection apparatus 21. The storage device 21f stores the stroke information and the meta information in association with each other. The storage device 21f stores the handwriting action trajectory group and the meta information in association with each other. The storage device 21f is also used as a work area by the CPU 21e. Two or more imaging devices 21g are provided at different positions and capture the handwriting action trajectory drawn by the writing implement 27. The communication device 21h performs communication with the handwriting action trajectory management system 3.

1-2-3. Third Example

Figure 4:
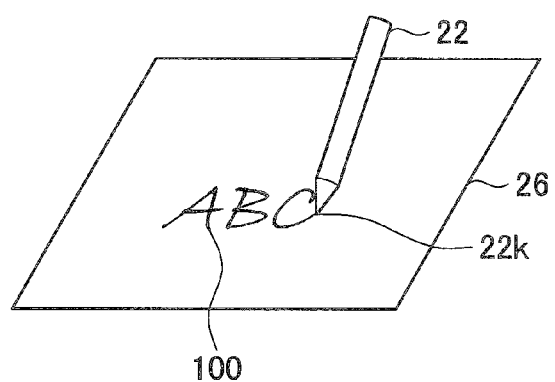
FIG. 4 is an explanatory diagram illustrating an example of a handwriting action trajectory acquisition system.

Next, a Third Example Will be Described with Reference to FIGS. 4, 9, and 10. A handwriting action trajectory acquisition system 2 according to a third example includes an information processing apparatus 22.

The information processing apparatus 22 is a writing implement type computer. The information processing apparatus 22 detects a handwriting action trajectory by detecting a movement of a front end portion 22k thereof. Here, the information processing apparatus 22 may be able to draw a handwriting action trajectory or may not be able to draw a handwriting action trajectory. In the example illustrated in FIG. 4, a user uses the information processing apparatus 22 to draw a handwriting action trajectory 100 on a paper (object) 26.

Figure 9:
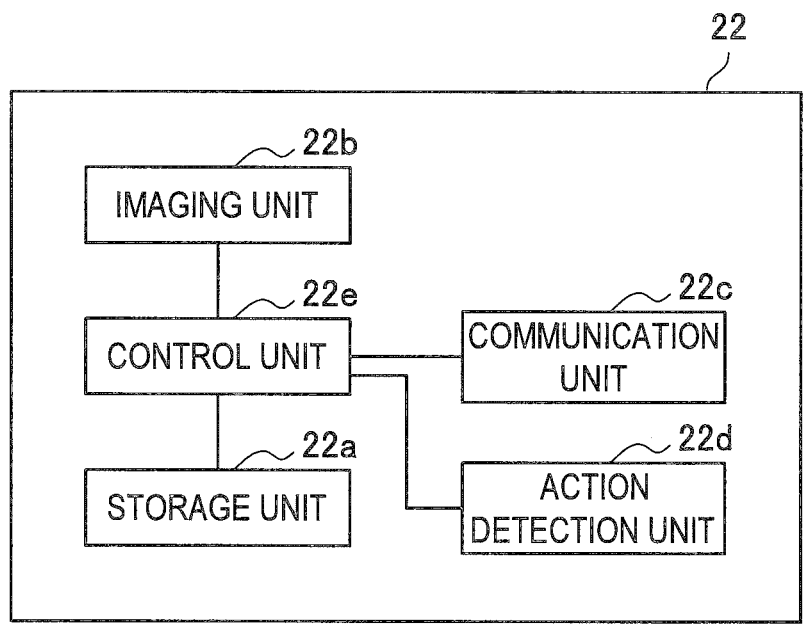
FIG. 9 is a block diagram illustrating an example of a handwriting action trajectory acquisition system.

As illustrated in FIG. 9, the information processing apparatus 22 includes a storage unit 22a, an imaging unit 22b, a communication unit 22c, an action detection unit 22d, and a control unit 22e (first control unit). The storage unit 22a stores a variety of meta information as well as programs necessary for processing that is performed by the information processing apparatus 22. Also, the storage unit 22a stores handwriting action trajectory information and meta information in association with each other. The contents of the meta information are the same as those described above.

The imaging unit 22b captures the front end portion 22k. Then, the imaging unit 21b outputs captured image information obtained by the capturing to the control unit 21d. The communication unit 22c performs communication with the handwriting action trajectory management system 3. The action detection unit 22d detects whether the user uses the information processing apparatus 22. Specifically, the action detection unit 22d detects whether or not the user uses the information processing apparatus 22 by detecting a pressure applied to the information processing apparatus 22, a change in a temperature of the information processing apparatus 22, a fingerprint of a finger touching the information processing apparatus 22, a movement of the information processing apparatus 22, and the like. Then, the action detection unit 22d outputs detection result information about detection results to the control unit 22e. The action detection unit 22d may detect the use of the information processing apparatus 22 by other methods. For example, the action detection unit 22d may a mechanical switch. The user presses the switch when the user uses the information processing apparatus 22.

The control unit 22e performs the same processing as the control unit 20e. However, the control unit 22e generates handwriting action trajectory information based on the captured image information. That is, the control unit 22e specifies a position of the front end portion 22k based on the captured image. Then, the control unit 22e specifies xy coordinates of the front end portion 22k, with an end point of a previous stroke as a reference (origin). Then, the control unit 22e sets the xy coordinates of the front end portion 22k as xy coordinates of a stroke configuration point. In this way, the control unit 22e specifies relative xy coordinates based on the previous stroke. For example, the control unit 22e may specify the xy coordinates of the stroke configuration point by other methods. It is obvious that a gyro sensor instead of the imaging unit 22b may be provided in the information processing apparatus 22. In this case, the control unit 22e may specify the xy coordinates of the stroke configuration point based on information provided from the gyro sensor, that is, information about the movement of the information processing apparatus 22. Also, in a case where a specific dot pattern is drawn on a surface of an object, the control unit 22e may specify xy coordinates of each point based on a positional relationship between each point constituting the handwriting action trajectory and the dot pattern.

Also, the control unit 22e detects a time for which the user uses the information processing apparatus 22, based on the detection result information provided from the action detection unit 22d. Then, the control unit 22e groups the stroke drawn within the time as one-page stroke. In this way, the control unit 22e generates a handwriting action trajectory group.

Here, the control unit 22e may group stroke information in units of rows. Specifically, in a case where an end point of a certain stroke and a start point of another stroke exist within a predetermined distance, the control unit 22e determines that these strokes belong to the same row. The control unit 22e may supplementarily perform temporal determination, in addition to the distance determination. That is, in a case where an end point of one stroke and a start point of another stroke exist within a predetermined distance and an interval between an end time of one stroke and a start time of another stroke is within a predetermined time, the control unit 22e determines that these strokes belong to the same row.

Figure 10:
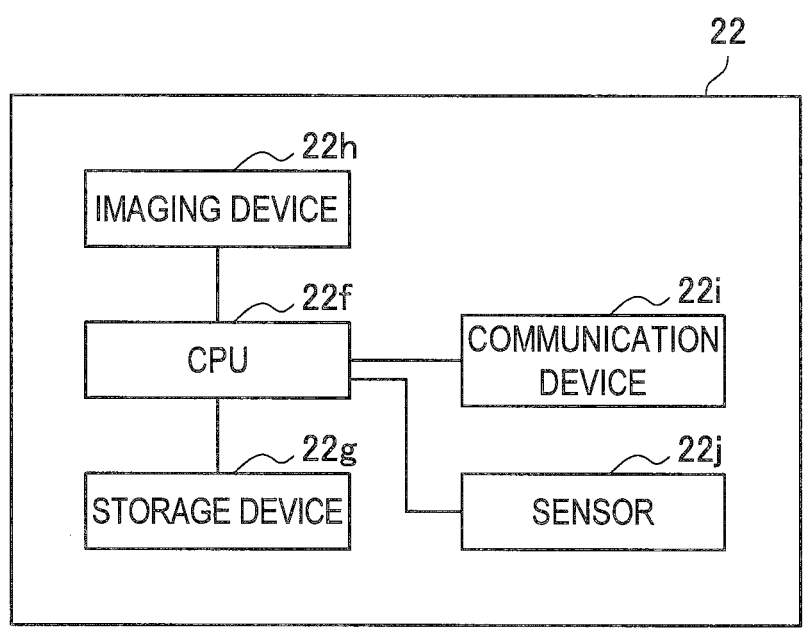
FIG. 10 is a hardware configuration diagram illustrating an example of a handwriting action trajectory acquisition system.

As illustrated in FIG. 10, the information processing apparatus 22 includes a CPU 22f, a storage device 22g, an imaging device 22h, a communication device 22i, and a sensor 22j. By such hardware configurations, the information processing apparatus 22 realizes the storage unit 22a, the imaging unit 22b, the communication unit 22c, the action detection unit 22d, and the control unit 22e, which have been described above. Such hardware configurations are realized by electronic circuits or the like.

The CPU 22f reads and executes programs stored in the storage device 22g. The storage device 22g is configured by a ROM, a RAM, a nonvolatile memory, or the like. The storage device 22g stores programs for realizing the storage unit 22a, the imaging unit 22b, the communication unit 22c, the action detection unit 22d, and the control unit 22e in the information processing apparatus 22. The storage device 22g stores the stroke information and the meta information in association with each other. The storage device 22g stores the handwriting action trajectory group and the meta information in association with each other. The storage device 22g is also used as a work area by the CPU 22f. The imaging device 22h captures the front end portion 22k of the information processing apparatus 22. The communication device 22i performs communication with the handwriting action trajectory management system 3. The sensor 22j detects a pressure applied to the information processing apparatus 22, a change in a temperature of the information processing apparatus 22, a fingerprint of a finger touching the information processing apparatus 22, a movement of the information processing apparatus 22, and the like.

In any example, the handwriting action trajectory acquisition system 2 generates the stroke information and associates the meta information with the stroke information. Furthermore, the handwriting action trajectory acquisition system 2 generates the handwriting action trajectory group by grouping the stroke information with respect to each page or row, and imparts the meta information to the handwriting action trajectory group as well. Then, the handwriting action trajectory acquisition system 2 transmits such information to the handwriting action trajectory management system 3. The first to third examples may be arbitrarily combined with one another. For example, the second example and the third example may be combined with each other. In this case, for example, information detected by the information processing apparatus 22 may be mainly used, and information detected by the handwriting action trajectory detection apparatus 21 may be used in a case where the detection accuracy of the information processing apparatus 22 is lowered.

(1.3. Configuration of Handwriting Action Trajectory Management System)

The handwriting action trajectory management system 3 is a system that manages the stroke information and the meta information, and several examples thereof may be taken. Hereinafter, examples of the handwriting action trajectory management system 3 will be sequentially described.

1-3-1. First Example

First, a first example will be described with reference to FIGS. 1 and 13. A handwriting action trajectory management system 3 according to a first example includes a handwriting action trajectory management apparatus 30.

Figure 13:
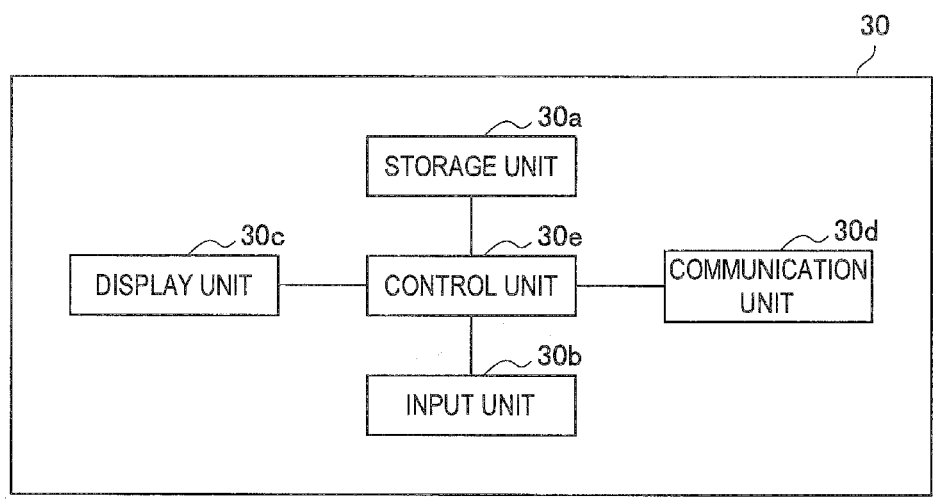
FIG. 13 is a block diagram illustrating an example of a handwriting action trajectory management apparatus.

As illustrated in FIG. 13, the handwriting action trajectory management apparatus 30 includes a storage unit 30a, an input unit 30b, a display unit 30c, a communication unit 30d, and a control unit 30e (second control unit). The storage unit 30a stores information provided from the handwriting action trajectory acquisition system 2 as well as programs necessary for processing that is performed by the handwriting action trajectory management apparatus 30. The input unit 30b receives a user's various input actions (including a handwriting action). Examples of the input unit 30b may include a touchscreen, a keyboard, a mouse, and a touch pen. The input unit 30b outputs information input by the user, that is, input action information, to the control unit 30e.

The display unit 30c displays a variety of information. For example, the display unit 30c displays stroke information in units of groups (in units of pages or rows). The communication unit 30d acquires a variety of information (for example, stroke information and meta information) from the handwriting action trajectory acquisition system 2 and outputs the acquired information to the control unit 30e.

The control unit 30e performs the following processing as well as the control of the various structural elements included in the handwriting action trajectory management apparatus 30. That is, the control unit 30e stores information provided from the handwriting action trajectory acquisition system 2 in the storage unit 30a. Also, the control unit 30e performs a variety of processing for the stroke information, based on the meta information. Examples of such processing may include searching, reproduction, and correction (beauty correction) of the stroke information, association of commands with the stroke information, execution of the commands, and the like. Details will be described below.

Figure 14:
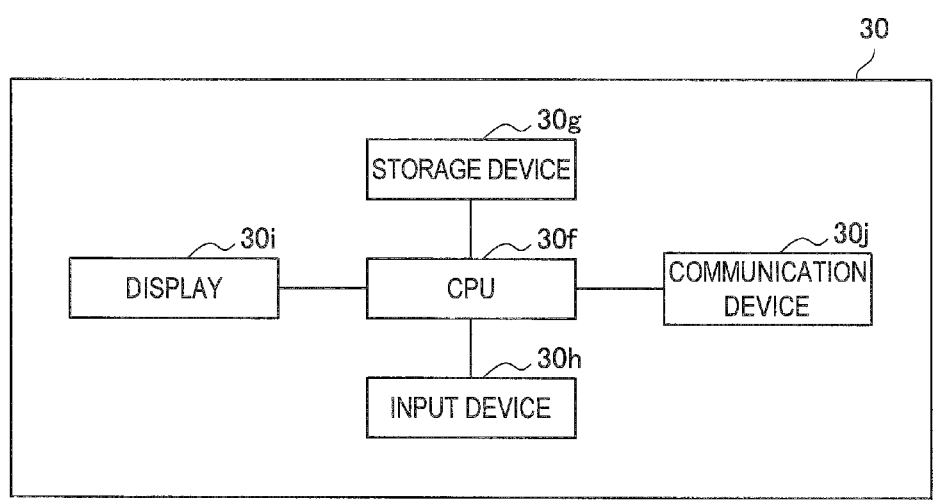
FIG. 14 is a hardware configuration diagram illustrating an example of a handwriting action trajectory management apparatus.

As illustrated in FIG. 14, the handwriting action trajectory management apparatus 30 includes a CPU 30f, a storage device 30g, an input device 30h, a display 30i, and a communication device 30j as hardware configurations. By such hardware configurations, the handwriting action trajectory management apparatus 30 realizes the storage unit 30a, the input unit 30b, the display unit 30c, the communication unit 30d, and the control unit 30e, which have been described above. Such hardware configurations are realized by electronic circuits or the like.

The CPU 30f reads and executes programs stored in the storage device 30g. The storage device 30g is configured by a ROM, a RAM, a nonvolatile memory, a hard disk or the like. The storage device 30g stores programs for realizing the storage unit 30a, the input unit 30b, the display unit 30c, the communication unit 30d, and the control unit 30e in the handwriting action trajectory management apparatus 30. The storage device 30g stores information provided from the handwriting action trajectory acquisition system 2. The storage device 30g is also used as a work area by the CPU 30f. The communication device 30j performs communication with the handwriting action trajectory acquisition system 2. In a case where the handwriting action trajectory acquisition system 2 is configured by the information processing apparatus 20 (first example), the information processing apparatus 20 may have the function of the handwriting action trajectory management apparatus 30.

1-3-2. Second Example

Next, a second example of the handwriting action trajectory management system 3 will be described with reference to FIGS. 1, 15, 16, and 17. The handwriting action trajectory management system 3 according to the second example includes first and second storages 31 and 32 and a network 33 in addition to the handwriting action trajectory management apparatus 30.

Figure 16:
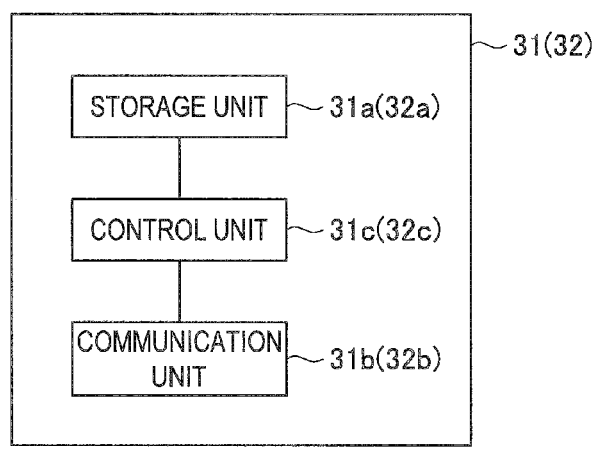
FIG. 16 is a block diagram illustrating an example of first and second storages.

As illustrated in FIG. 16, the first storage 31 includes a storage unit 31a, a communication unit 31b, and a control unit 31c. The storage unit 31a stores stroke information and handwriting action trajectory groups as well as programs necessary for processing that is performed by the first storage 31. The above-described integrated ID is imparted to each piece of the stroke information. The communication unit 31b performs communication among the handwriting action trajectory acquisition system 2, the handwriting action trajectory management apparatus 30, and the second storage 32 through the network 33. The control unit 31c controls the respective structural elements provided in the first storage 31.

Figure 17:
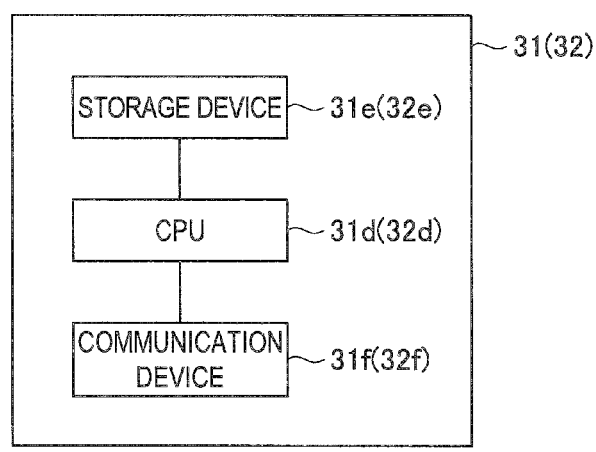
FIG. 17 is a hardware configuration diagram illustrating an example of first and second storages.

As illustrated in FIG. 17, the first storage 31 includes a CPU 31*d*, a storage device 31*e*, and a communication device 31*f* as hardware configurations. By these hardware configurations, the first storage 31 realizes the storage unit 31*a*, the communication unit 31*b*, and the control unit 31*c*, which have been described above. Such hardware configurations are realized by electronic circuits or the like.

The CPU 31*d* reads and executes a program stored in the storage device 31*e*. The storage device 31*e* is configured by a ROM, a RAM, a nonvolatile memory, a hard disk or the like. The storage device 31*e* stores stroke information and handwriting action trajectory groups as well as programs for realizing the storage unit 31*a*, the communication unit 31*b*, and the control unit 31*c* in the first storage 31. The storage device 31*e* is also used as a work area by the CPU 31*d*. The communication device 31*f* performs communication among the handwriting action trajectory acquisition system 2, the handwriting action trajectory management apparatus 30, and the second storage 32 through the network 33.

As illustrated in FIG. 16, the second storage 32 includes a storage unit 32*a*, a communication unit 32*b*, and a control unit 32*c*. The storage unit 32*a* stores meta information as well as programs necessary for processing that is performed by the second storage 32. The above-described integrated ID is imparted to each piece of the meta information. The communication unit 32*b* performs communication among the handwriting action trajectory acquisition system 2, the handwriting action trajectory management apparatus 30, and the first storage 31 through the network 33. The control unit 32*c* controls the respective structural elements provided in the second storage 32.

As illustrated in FIG. 17, the second storage 32 includes a CPU 32*d*, a storage device 32*e*, and a communication device 32*f* as hardware configurations. By these hardware configurations, the second storage 32 realizes the storage unit 32*a*, the communication unit 32*b*, and the control unit 32*c*, which have been described above. Such hardware configurations are realized by electronic circuits or the like.

The CPU 32*d* reads and executes a program stored in the storage device 32*e*. The storage device 32*e* is configured by a ROM, a RAM, a nonvolatile memory, a hard disk or the like. The storage device 32*e* stores meta information as well as programs for realizing the storage unit 32*a*, the communication unit 32*b*, and the control unit 32*c* in the second storage 32. The storage device 32*e* is also used as a work area by the CPU 32*d*. The communication device 32*f* performs communication among the handwriting action trajectory acquisition system 2, the handwriting action trajectory management apparatus 30, and the first storage 31 through the network 33.

The network 33 is a network for performing communication among the handwriting action trajectory acquisition system 2, the handwriting action trajectory management apparatus 30, the first storage 31, and the second storage 32.

In this way, the handwriting action trajectory management system 3 according to the second example stores the meta information, the stroke information, and the handwriting action trajectory groups in separate storages. Therefore, the confidentiality of information is improved. That is, the handwriting action trajectory management system 3 according to the second example is a system in which a plurality of functions is realized by separate structural elements, that is, a cloud computing system.

The number of the storage may be one. In this case, for example, the storage may store the meta information and the handwriting action trajectory management apparatus 30 may store the stroke information or the like. It is obvious that the same is true of the reverse. Also, the configuration of the handwriting action trajectory management system 3 will be further subdivided.

<2. Processing by Information Processing System>

Next, the procedures of the processing by the information processing system 1 will be described. In the following description, unless otherwise indicated, it is assumed that both the handwriting action trajectory acquisition system 2 and the handwriting action trajectory management system 3 are configured by the first example.

(2-1. Basic Processing)

Figure 18:
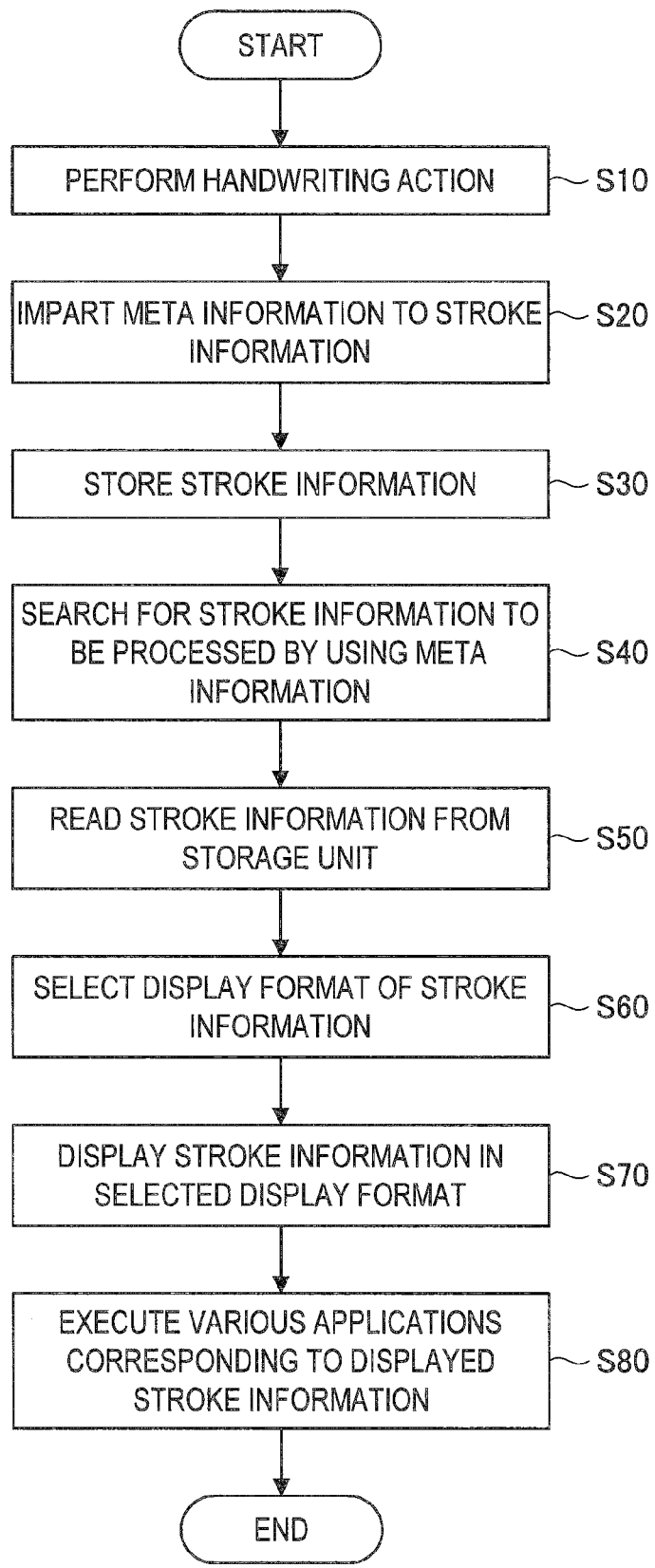
FIG. 18 is a flowchart illustrating a procedure of processing by an information processing system.

First, the procedures of the basic processing will be described with reference to a flowchart illustrated in FIG. 18. In step S10, a user performs a handwriting action by using the writing implement 25. The input unit 20*b* detects a handwriting action trajectory drawn by the user's handwriting action and outputs handwriting action trajectory information about the handwriting action trajectory to the control unit 20*e*.

In step S20, the control unit 20*e* divides the handwriting action trajectory into one or more strokes. The control unit 20*e* imparts meta information to stroke information indicating the respective strokes. Furthermore, the control unit 20*e* generates a handwriting action trajectory group by grouping stroke information. The control unit 20*e* may set one handwriting action trajectory group as one-page stroke information. The control unit 20*e* imparts meta information to the handwriting action trajectory group.

In step S30, the control unit 20*e* stores the stroke information, the handwriting action trajectory group, and the meta information imparted thereto in the storage unit 20*a*. Furthermore, the control unit 20*e* outputs the stroke information, the handwriting action trajectory group, and the meta information imparted thereto to the communication unit 20*d*. The communication unit 20*d* transmits such information to the handwriting action trajectory management apparatus 30. The communication unit 30*d* of the handwriting action trajectory management apparatus 30 receives such information and outputs the received information to the control unit 30*e*. The control unit 30*e* stores such information in the storage unit 30*a*.

In step S40, the user inputs search information for specifying the stroke information to be processed. Here, the search information is intended to specify one of pieces of the above-described meta information. The control unit 30*e* stores the stroke information matched with the search information.

In step S50, the control unit 30*e* reads the stroke information matched with the search information from the storage unit 30*a* in units of handwriting action trajectory groups (that is, in units of pages or rows). The control unit 30*e* may previously receive a user's biological information input by the user and set only the stroke information matched with the biological information as the object to be searched.

In step S60, the user selects a display format of the stroke information. Here, the display format of the stroke information is not particularly limited. Examples of the display format of the stroke information may include a time-series display format that displays the stroke information in time series, a geographic display format that displays the stroke information based on geographic information, and the like. Detailed examples of such display formats will be described below.

In step S70, the control unit 30*e* displays the stroke information in the selected display format. Here, the control unit 30*e* displays the stroke information in units of handwriting action trajectory groups.

In step S80, the control unit 30e performs a variety of processings (applications) with respect to the displayed stroke information. Detailed processing contents will be described below.

(2-2. Searching Process)

Next, the searching processing (processing subsequent to step S40) will be described in detail. The searching processing is processing that searches the stroke information based on the search information. The search information may be one of pieces of the meta information. Here, the searching processing will be described while exemplifying a case where the search information is time information, geographic information, and text information.

(2-2-1. Searching Processing Based on Time Information)

Figure 19:
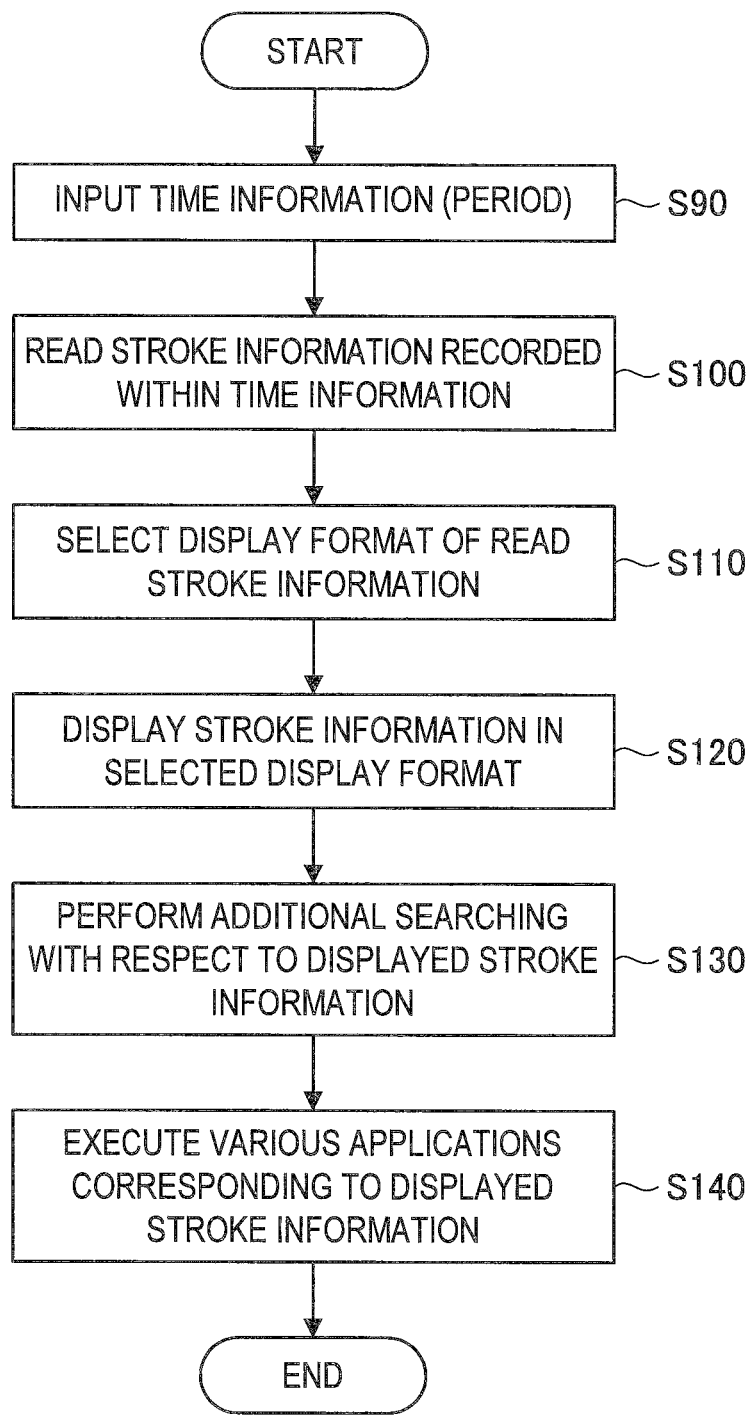
FIG. 19 is a flowchart illustrating a procedure of processing by an information processing system.
Figure 28:
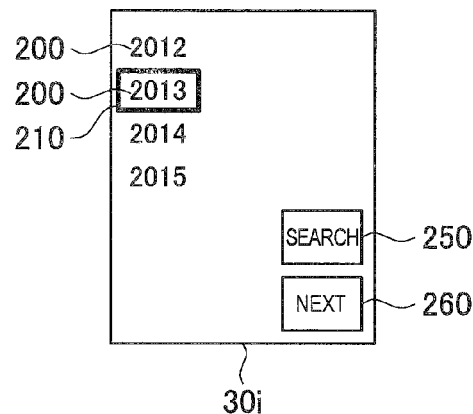
FIG. 28 is an explanatory diagram illustrating an example of a screen displayed by the information processing system.

First, the searching processing based on time information will be described with reference to FIG. 19. In step S90, the user inputs time information as search information. Here, input examples of the time information will be described with reference to FIGS. 28 to 30.

First, the control unit 30e displays a list of year information 200 indicating years. Furthermore, the control unit 30e displays a search execution button 250 and a detailed search information input button 260. The user selects desired year information from the year information 200. For example, the user taps the desired year information 200. The control unit 30e superimposes a frame image 210 on the year information 200 selected by the user. In a case where critical stroke information matched with the year information selected by the user (for example, underlined stroke information) exists, the control unit 30e may notify the user of the presence of the corresponding stroke information. For example, text information or voice information such as "there is important information" may be output.

Then, the user selects one of the search execution button 250 and the detailed search information input button 260. In a case where the user wants the year information as the search information, the user selects (for example, taps) the search execution button 250. In a case where the user wants to input more detailed search information than the year information, the user selects (for example, taps) the detailed search information input button 260.

Figure 29:
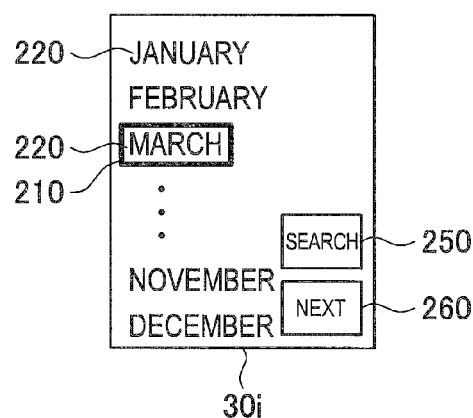
FIG. 29 is an explanatory diagram illustrating an example of a screen displayed by the information processing system.

In a case where the search execution button 250 is selected, the control unit 30e determines the year information as the search information and proceeds to step S100. On the other hand, in a case where the detailed search information is selected, as illustrated in FIG. 29, a list of month information 220 indicating January to December is displayed. The control unit 30e displays a search execution button 250 and a detailed search information input button 260. The user selects desired month information 220 from the month information 220. The control unit 30e superimposes a frame image 210 on the month information 220 selected by the user. Then, the user selects one of the search execution button 250 and the detailed search information input button 260. In a case where the user wants year and month information as the search information, the user selects the search execution button 250. In a case where the user wants to input more detailed search information than the month information, the user selects the detailed search information input button 260.

Figure 30:
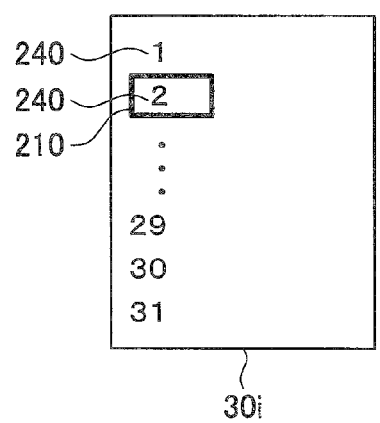
FIG. 30 is an explanatory diagram illustrating an example of a screen displayed by the information processing system.

In a case where the search execution button 250 is selected, the control unit 30e determines the year and month information as the search information and proceeds to step S100. On the other hand, in a case where the detailed search information is selected, as illustrated in FIG. 30, a list of date information 240 indicating a date within the month information selected by the user is displayed. The user selects desired date information 240 from the date information 240. The control unit 30e superimposes a frame image 210 on the date information 240 selected by the user. The control unit 30e sets the year, month, and date information input by the user as the search information.

In step S100, stroke information matched with the search information is searched. Here, the stroke information matched with the search information is stroke information recoded within a period indicated by the search information (time information), and more specifically, stroke information in which the time information among pieces of the meta information indicates the time within the search information. As described above, the user can designate the year, the month, and the date in a drill-down format. Therefore, the control unit 30e can perform searching in the drill-down format.

The control unit 30e may allow the user to input more detailed search information, such as hour or minute. For example, the control unit 30e may allow the user to input desired hour, minute, and the like by displaying a clock image, a scale indicating a time, or the like. Also, the control unit 30e may allow the user to directly input the time information. Also, the control unit 30e may allow the user to input two different pieces of time information and set an interval between such pieces of the time information as the search information.

In step S110, the user selects a display format of the stroke information. Here, the display format of the stroke information is not particularly limited. Examples of the display format of the stroke information may include the time-series display format and the geographic display formation described above.

In step S120, the control unit 30e displays the stroke information in the selected display format. Here, the control unit 30e displays the stroke information in units of handwriting action trajectory groups. An example of the time-series display format is illustrated in FIG. 31. The control unit 30e displays a list of pairs of a time information display field 300 and a group display field 310. It is preferable that the list is displayed while being matched with a screen size of the display unit 30c (display 30i).

The time information imparted to the handwriting action trajectory group is displayed in the time information display field 300. The stroke information belonging to the handwriting action trajectory group is displayed in the group display field 310. The list may include other meta information, for example, object information. For example, the background of the group display field 310 may be displayed with a color indicated by the object information (color of the object). Then, the control unit 30e shifts the list up and down based on the user's selection action (for example, up/down flick action). In a case where the user selects (for example, taps) one group display field 310, the control unit 30e may enlarge and display the handwriting action trajectory group selected by the user.

Here, the control unit 30e may highlight the handwriting action trajectory group matched with the search information and blur the handwriting action trajectory group not matched with the search information (for example, handwriting action trajectory group that is not matched with the search information but has time information close (adjacent) to the search information).

Figures 32, 33:
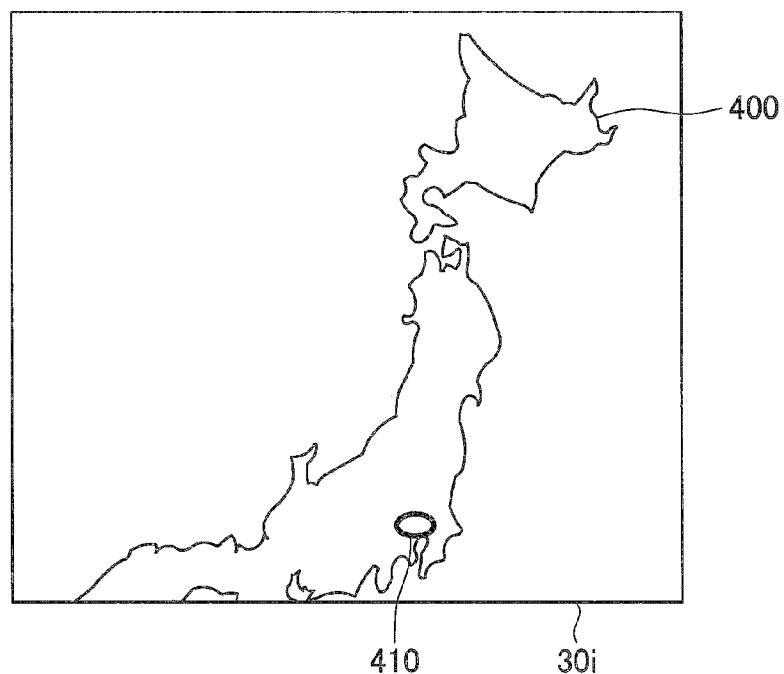
FIG. 32 is an explanatory diagram illustrating an example of a screen displayed by the information processing system.
FIG. 33 is an explanatory diagram illustrating an example of a screen displayed by the information processing system.

An example of the geographic display format is illustrated in FIG. 32. The control unit 30e displays a list of pairs of a geographic information display field 320 and a group display field 330. The geographic information imparted to the handwriting action trajectory group is displayed in the geographic information display field 320. The stroke information belonging to the handwriting action trajectory group is displayed in the group display field 330. The list may include other meta information, for example, object information. Then, the control unit 30e shifts the list up and down based on the user's selection action (for example, up/down flick action). In a case where the user selects one group display field, the control unit 30e enlarges and displays the handwriting action trajectory group selected by the user.

Here, the control unit 30e may highlight the handwriting action trajectory group matched with the search information and blur the handwriting action trajectory group not matched with the search information (for example, handwriting action trajectory group that is not matched with the search information but has geographic information close (adjacent) to the search information).

In step S130, the control unit 30e performs additional searching with respect to the displayed stroke information. That is, the control unit 30e allows the user to input the search information again. Then, stroke information matched with the additional search information is searched among pieces of the displayed stroke information. Specific methods of the additional searching are the same as the searching processing. Examples of the additional searching may include additional searching based on the time information, additional searching based on the geographic information, additional searching based on the text information, and the like. The control unit 30e displays the additionally searched stroke information. The display formats are the same as those described above. The control unit 30e may set the additionally searched stroke information as a non-selected state.

In step S140, the control unit 30e performs a variety of processings (applications) with respect to the displayed stroke information. Detailed processing contents will be described below. Here, the control unit 30e may perform a variety of processing on the enlarged handwriting action trajectory group. Furthermore, the user may directly select desired stroke information from the enlarged stroke information. For example, the user may drag the desired stroke information with his or her finger. In this case, the control unit 30e displays the stroke information selected by the user in a form (for example, inversion, discoloration, flashing, or the like) capable of distinguishing from other stroke information. Then, the control unit 30e may perform a variety of processing on the stroke information selected by the user.

(2-2-2. Searching Processing Based on Geographic Information)

Figure 20:
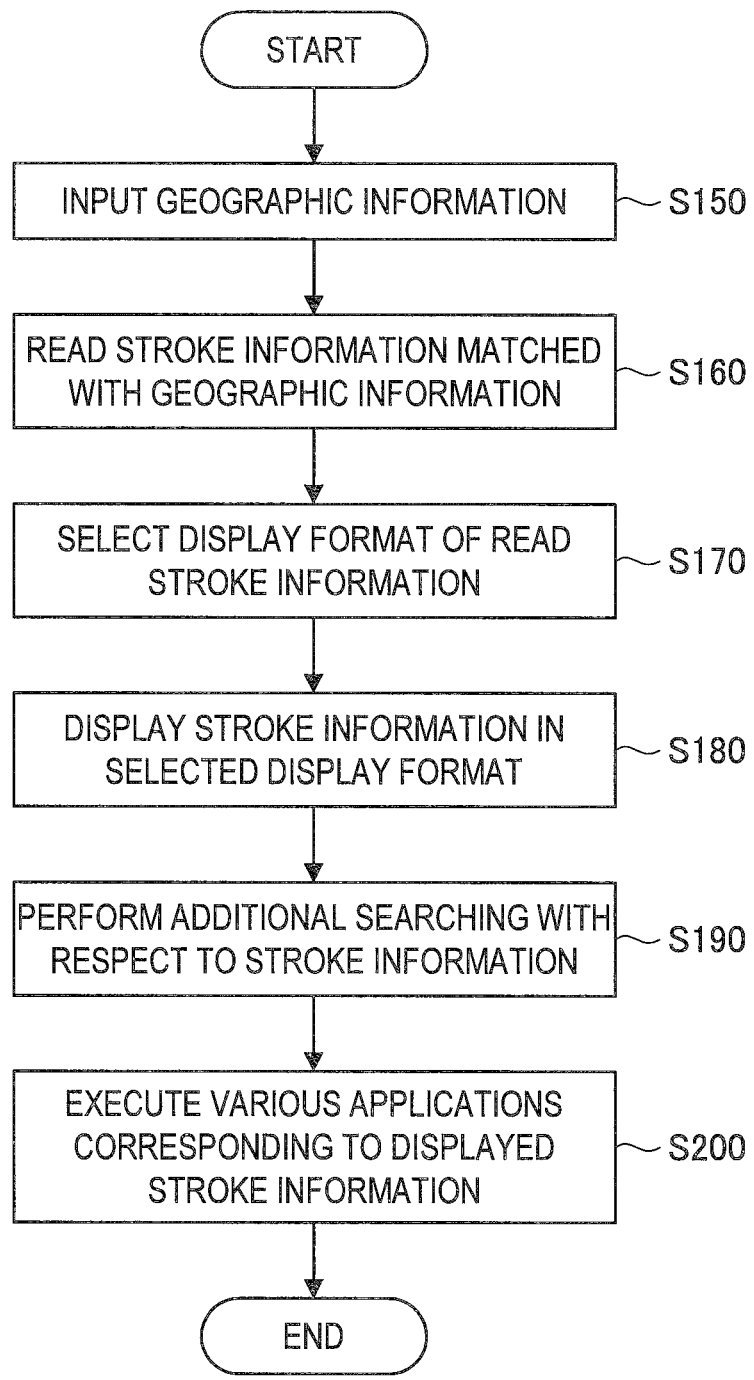
FIG. 20 is a flowchart illustrating a procedure of processing by an information processing system.

First, the searching processing based on geographic information will be described with reference to FIG. 20. In step S150, the user inputs geographic information as search information. Here, input examples of the geographic information will be described with reference to FIG. 33.

First, the control unit 30e displays a map image 400. The control unit 30e may display an overview of a handwriting action trajectory group on the map image 400. For example, the control unit 30e may highlight a position indicated by the geographic information imparted to the handwriting action trajectory group on the map image 400. The handwriting action trajectory group including important stroke information may be highlighted in a display mode different from other handwriting action trajectory groups. The user selects a desired position on the map image 400. For example, the user taps the desired position. The control unit 30e superimposes a frame image 410 on the position selected by the user. Then, the control unit 30e determines the position selected by the user as the search information. The control unit 30e may allow the user to select the map information in a drill-down format. Specifically, in a case where the user selects one position within the map image 400, the control unit 30e enlarges and displays the selected position. Then, the control unit 30e allows the user to select a desired position on the enlarged and displayed map image. Also, the control unit 30e may allow the user to directly input the map information (for example, latitude and longitude, address, or the like).

In step S160, stroke information matched with the search information is searched. Here, the stroke information matched with the search information is stroke information recoded within a range indicated by the search information (geographic information), and more specifically, stroke information in which the geographic information among pieces of the meta information indicates a position within the search information.

In step S170, the user selects a display format of the stroke information. Here, the display format of the stroke information is not particularly limited. Examples of the display format of the stroke information may include the time-series display format and the geographic display format described above.

In step S180, the control unit 30e displays the stroke information in the selected display format. Specific display examples are the same as those described above.

In step S190, the control unit 30e performs additional searches with respect to the displayed stroke information. That is, the control unit 30e allows the user to input the search information again. Then, stroke information matched with the additional search information is searched, among pieces of the displayed stroke information.

In step S200, the control unit 30e performs a variety of processings (applications) with respect to the displayed stroke information. Detailed processing contents will be described below.

(2-2-3. Searching Processing Based on Text Information)

Figure 21:
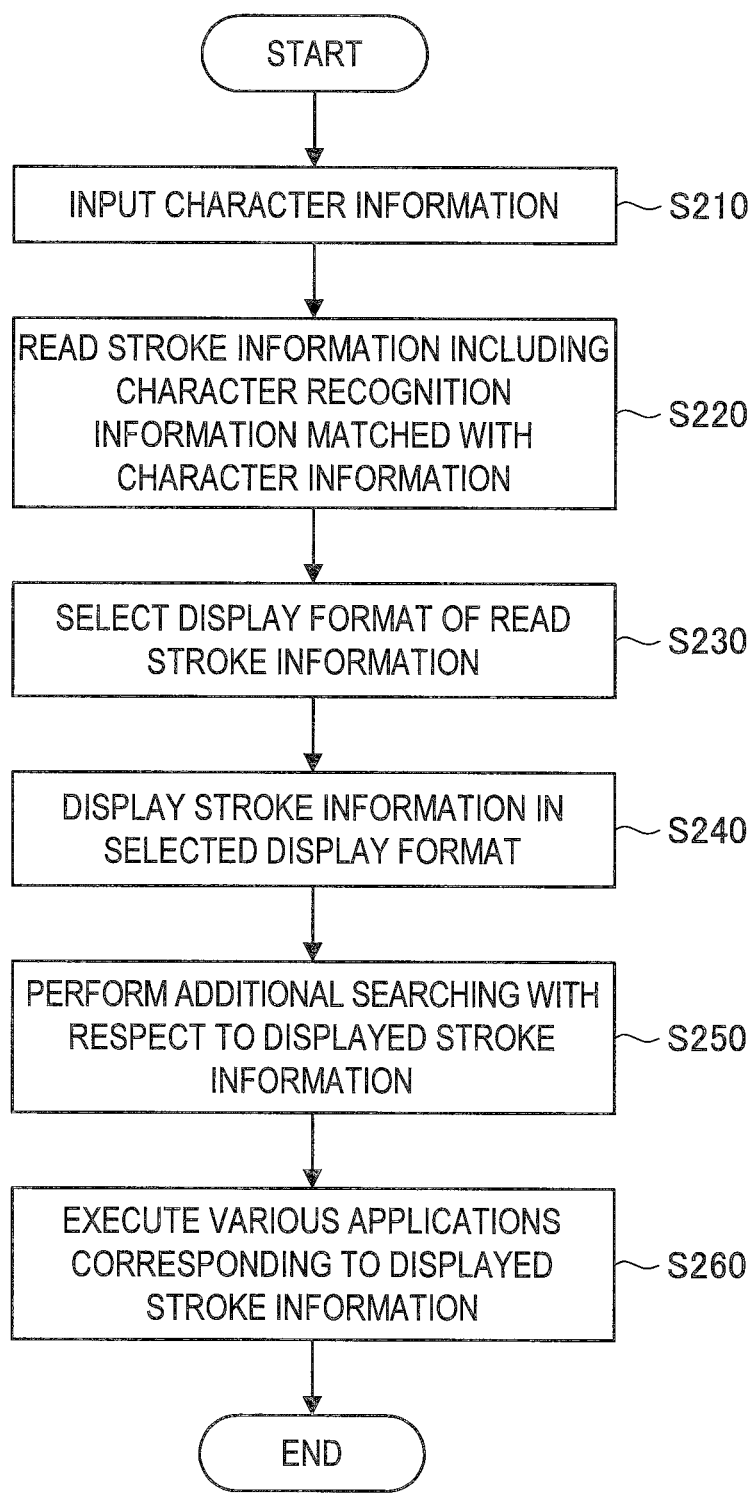
FIG. 21 is a flowchart illustrating a procedure of processing by an information processing system.

First, the searching processing based on text information will be described with reference to FIG. 21. In step S210, the user inputs text information (character information) as search information.

In step S220, the control unit 30e sets the text information input by the user as the search information and search stroke information matched with the search information. Here, the stroke information matched with the search information is stroke information in which text information among pieces of the meta information includes the search information.

In step S230, the user selects a display format of the stroke information. Here, the display format of the stroke information is not particularly limited. Examples of the display format of the stroke information may include the time-series display format and the geographic display formation described above.

In step S240, the control unit 30e displays the stroke information in the selected display format. Specific display examples are the same as those described above.

In step S250, the control unit 30e performs additional searches with respect to the displayed stroke information. That is, the control unit 30e allows the user to input the search information again. Then, stroke information matched with the additional search information is searched among pieces of the displayed stroke information. Here, in a case where the stroke information indicating desired text information exists in the handwriting action trajectory group displayed by the first search, the user may select the corresponding stroke information. For example, the user taps the corresponding stroke information. Then, the control unit 30e acquires text information corresponding to the stroke information selected by the user and sets the corresponding text information as the search information.

In step S260, the control unit 30e performs a variety of processings (applications) with respect to the displayed stroke information. Detailed processing contents will be described below. The search information may be meta information other than the time information, the geographic information, and the text information, which have been described above. For example, the control unit 30e may set a user's biological information, writing pressure information, type information of the writing implement, object information, and the like as the search information. Such search information may be directly input by the user, or a list of the search information is displayed and the user may be allowed to select one of listed candidates.

(2-3. Sequential Reproduction Processing of Unit Trajectory)

Figure 22:
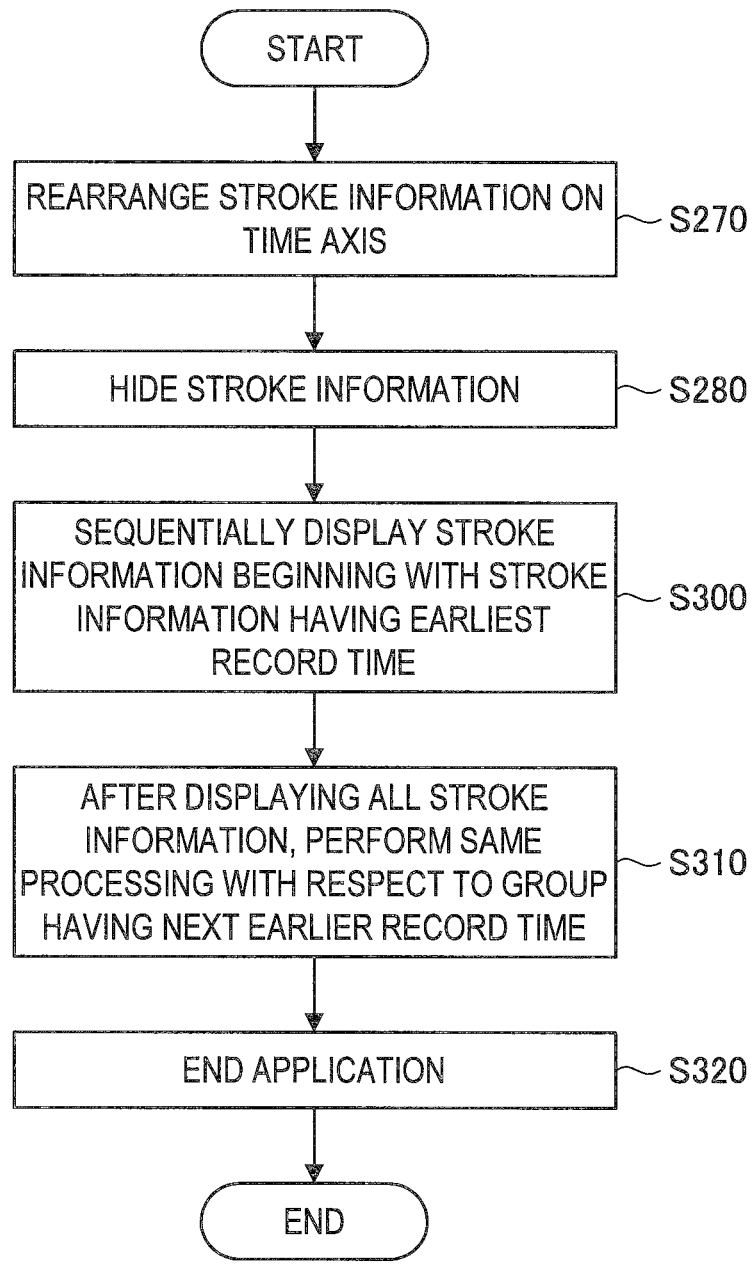
FIG. 22 is a flowchart illustrating a procedure of processing by an information processing system.

Next, sequential reproduction processing of unit trajectory (stroke) as a specific example of the application will be described with reference to a flowchart illustrated in FIG. 22.

In step S270, the control unit 30e rearranges the displayed stroke information on a time axis in units of handwriting action trajectory groups.

In step S280, the control unit 30e hides all the displayed stroke information. Here, the word "hides" means that the stroke information is simply deleted from the display screen, or the display format of the stroke information is changed to the same display format as the background color (for example, the same color, brightness, and chroma as the background color). Then, the control unit 30e performs processing of subsequent steps S300 to S310 in units of the handwriting action trajectory groups.

In step S300, the control unit 30e sequentially reproduces pieces of stroke information beginning with stroke information having the earliest record time (start time in meta information), among pieces of hidden stroke information (or stroke information displayed in the same display format as the background color). Specifically, the control unit 30e reproduces the stroke information by sequentially displaying the stroke configuration point from the start point of the stroke information. Here, the word "displaying" means that the information is simply displayed on the screen, or the display format is changed to a display format capable of distinguishing from the background color. The control unit 30e reproduces all stroke information belonging to the handwriting action trajectory group.

In step S310, after reproducing all stroke information belonging to the handwriting action trajectory group, the control unit 30e performs the same processing as steps S300 with respect to a next handwriting action trajectory group. The control unit 30e ends the reproduction of all handwriting action trajectory groups and proceeds to step S320. In step S320, the control unit 30e ends the present processing.

Figure 34:
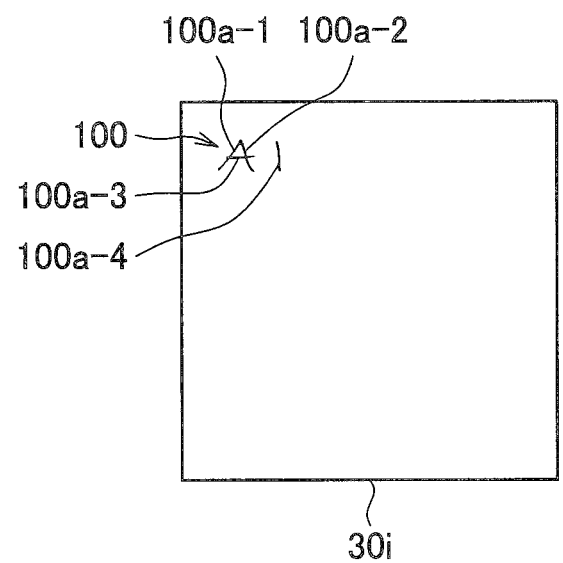
FIG. 34 is an explanatory diagram illustrating an example of a screen displayed by the information processing system.
Figure 35:
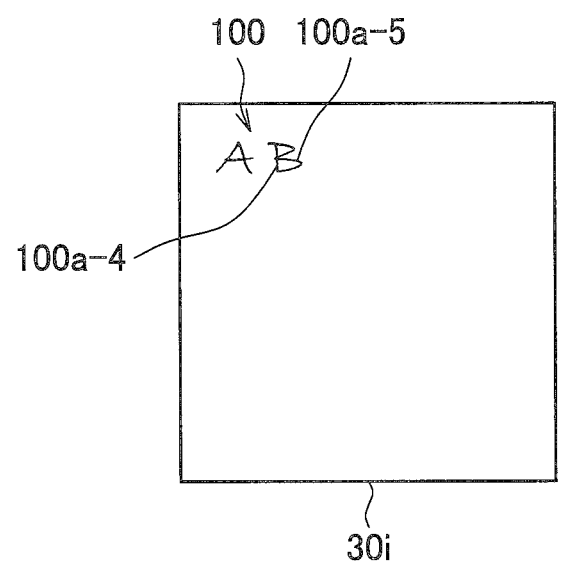
FIG. 35 is an explanatory diagram illustrating an example of a screen displayed by the information processing system.

Here, a specific example of the sequential reproduction processing of unit trajectory will be described with reference to FIGS. 34 to 37. In this example, a handwriting action trajectory group, in which characters "ABCD" are drawn, is reproduced. As illustrated in FIG. 34, the control unit 30e sequentially reproduces strokes 100a-1 to 100a-3 (strokes constituting the alphabet "A"). Then, the control unit 30e reproduces a stroke 100a-4 (stroke constituting a part of the alphabet "B"). Then, as illustrated in FIG. 35, the control unit 30e reproduces a stroke 100a-5 (stroke constituting a part of the alphabet "B").

Figure 36:
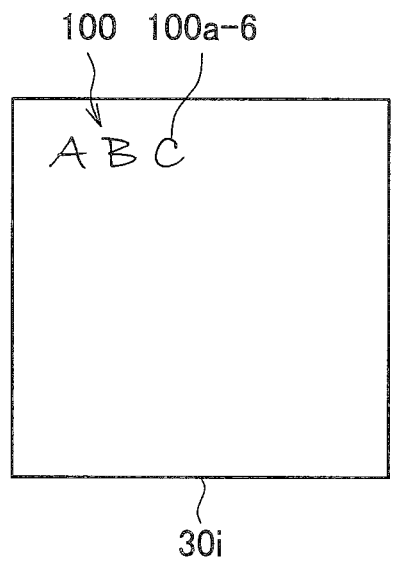
FIG. 36 is an explanatory diagram illustrating an example of a screen displayed by the information processing system.
Figure 37:
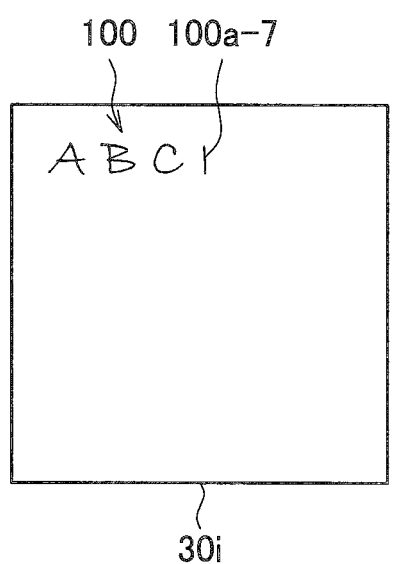
FIG. 37 is an explanatory diagram illustrating an example of a screen displayed by the information processing system.

Then, as illustrated in FIG. 36, the control unit 30e reproduces a stroke 100a-6 (stroke constituting the alphabet "C"). Then, as illustrated in FIG. 37, the control unit 30e reproduces a stroke 100a-7 (stroke constituting a part of the alphabet "D"). After that, the control unit 30e reproduces the handwriting action trajectory group by repeating the same processing.

(2-4. Correction Processing of Handwriting Action Trajectory Information)

Figure 23:
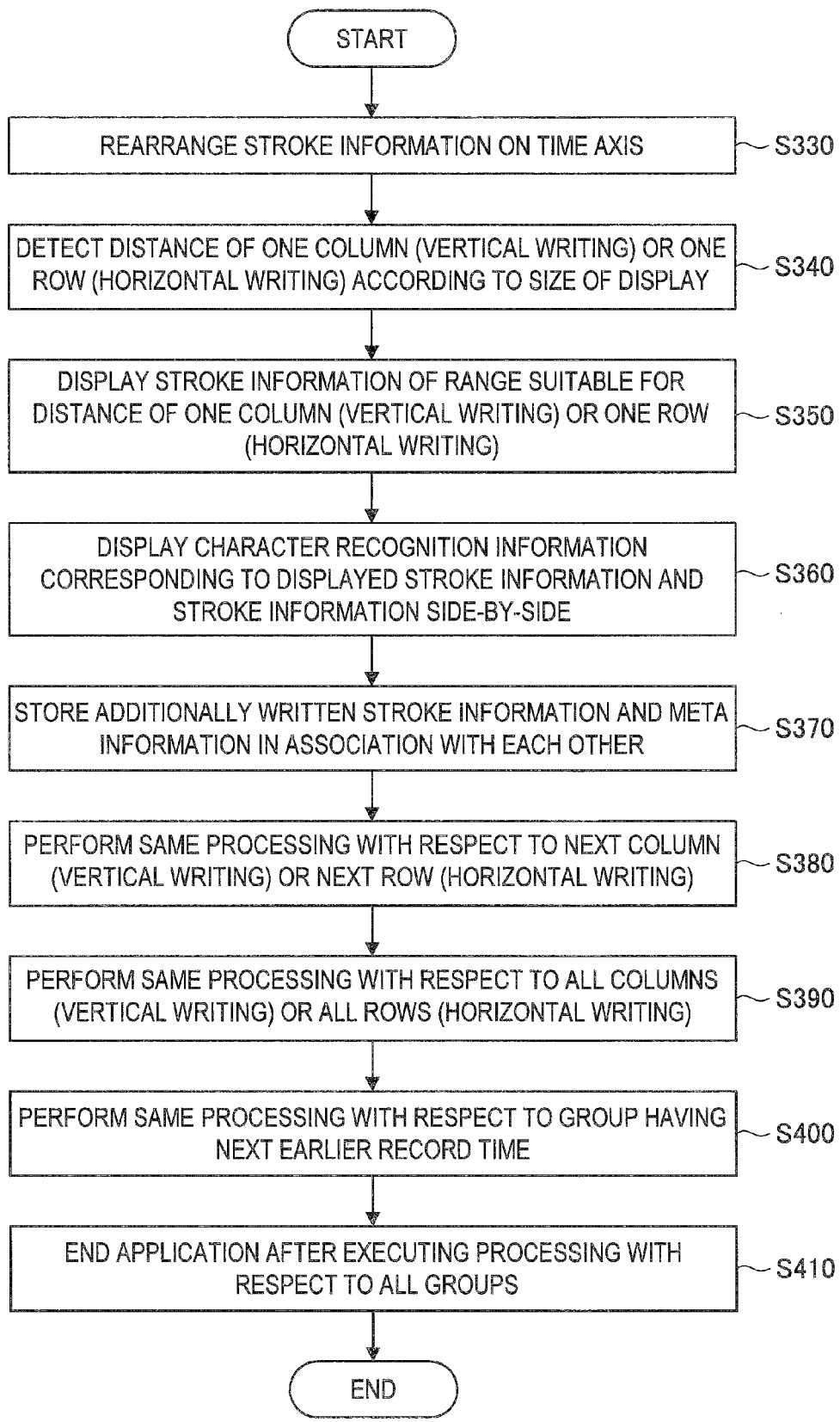
FIG. 23 is a flowchart illustrating a procedure of processing by an information processing system.

Next, correction processing of handwriting action trajectory information as a specific example of the application will be described with reference to a flowchart illustrated in FIG. 23.

In step S330, the control unit 30e rearranges the displayed stroke information on a time axis in units of handwriting action trajectory groups. Then, the control unit 30e sequentially performs processing subsequent to step S340 from the handwriting action trajectory group whose record time (start time of the meta information) is early.

In step S340, the control unit 30e detects a distance of one column (vertical writing) or one row (horizontal writing) according to the size of the display 30i. The one-column distance corresponds to the vertical width of the display 30i, and the one-row distance corresponds to the horizontal width of the display 30i.

In step S350, the control unit 30e displays the stroke information of a range suitable for the distance of one column or one row.

In step S360, the control unit 30e displays the cache information (character recognition information) corresponding to the displayed stroke information and the stroke information side-by-side. For the user, the text information is a sample.

In step S370, the control unit 30e receives stroke information additionally written by the user. The user performs the handwriting action while viewing the text information (sample). That is, the stroke information is additionally written. Here, the user draws a handwriting action trajectory on the display 30i by using, for example, a touch pen. For example, the user corrects the length, angle, wing, tome of the handwriting action trajectory. The control unit 30e stores the additionally written stroke information and the meta information in the storage unit 30a in association with each other. In the meta information imparted to the stroke information, the time information may be a start time and an end time of the stroke correction.

In step S380, the control unit 30e displays unprocessed stroke information by one column (or one row) and repeats processing subsequent to step S350.

In step S390, the control unit 30e performs processing subsequent to step S350 with respect to all stroke information displayed in step S330.

In step S400, the control unit 30e performs processing subsequent to step S350 with respect to the handwriting action trajectory group, whose record time is earliest, among the unprocessed handwriting action trajectory groups.

In step S410, the control unit 30e performs processing subsequent to step S350 with respect to all handwriting action trajectory groups displayed in step S330. After that, the control unit 30e ends the present processing.

Figure 38:
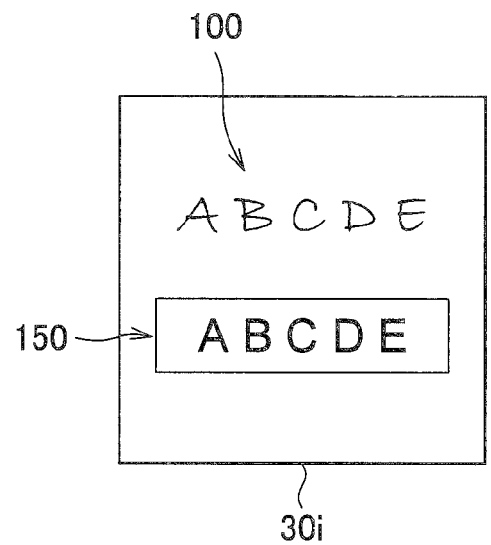
FIG. 38 is an explanatory diagram illustrating an example of a screen displayed by the information processing system.

Here, a specific example of the correction processing of the handwriting action trajectory information will be described with reference to FIG. 38. In this example, a handwriting action trajectory group, in which characters "ABCDE" are drawn, is corrected. As illustrated in FIG. 38, the control unit 30e displays the handwriting action trajectory group (handwriting action trajectory 100), in which "ABCDE" are drawn, and the text information 150 corresponding to the handwriting action trajectory group in parallel to each other.

Then, the control unit 30*e* receives stroke information additionally written by the user. The user inputs "ABCDE" through the handwriting action while viewing text information (sample). That is, the stroke information is additionally written. Here, the user draws "ABCDE" on the display 30*i* by using, for example, a touch pen. The control unit 30*e* stores the additionally written stroke information and the meta information in the storage unit 30*a* in association with each other.

(2-5. Command Correspondence Processing)

Figure 24:
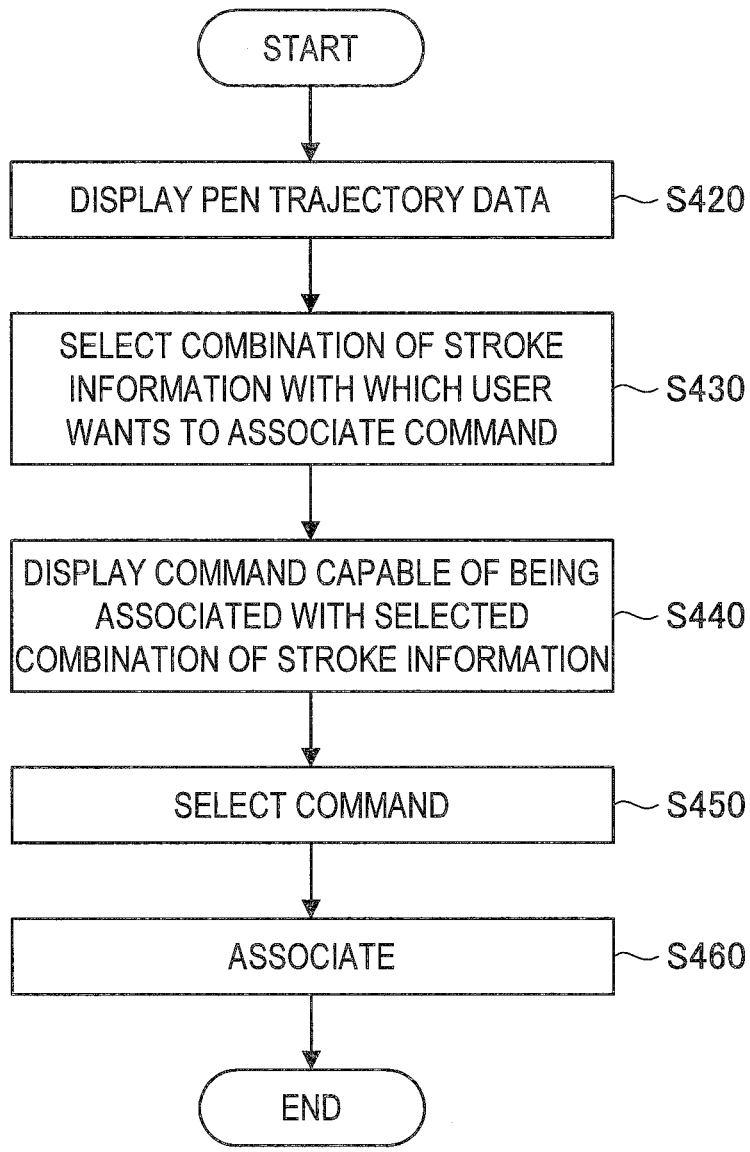
FIG. 24 is a flowchart illustrating a procedure of processing by an information processing system.

Next, command correspondence processing as a specific example of the application will be described with reference to a flowchart illustrated in FIG. 24.

In step S420, the control unit 30*e* rearranges the displayed stroke information on a time axis in units of handwriting action trajectory groups. Then, the control unit 30*e* enlarges the handwriting action trajectory group, whose record time (start time of the meta information) is early, and sequentially performs processing subsequent to step S430 from the handwriting action trajectory group.

In step S430, the user directly selects desired stroke information from the enlarged stroke information. For example, the user drags the desired stroke information with his or her finger. Here, the user selects a combination of two or more pieces of stroke information. The control unit 30*e* displays the stroke information selected by the user in an aspect (for example, inversion, discoloration, flashing, or the like) capable of distinguishing from other stroke information.

In step S440, the control unit 30*e* displays a list of commands that can be associated with the stroke information selected by the user. For example, the control unit 30*e* displays a list of icon-type commands.

In step S450, the user selects a desired command from the list of the commands. For example, the user taps an icon corresponding to the desired command.

In step S460, the control unit 30*e* associates the command selected by the user with the stroke information. In a case where the user selects another stroke information, the control unit 30*e* repeats processing subsequent to step S430. After that, the user performs a group switching action (for example, flick action). In response to this, the control unit 30*e* enlarges and displays another handwriting action trajectory group and performs processing subsequent to step S430. After that, the control unit 30*e* ends the present processing.

Figure 39:
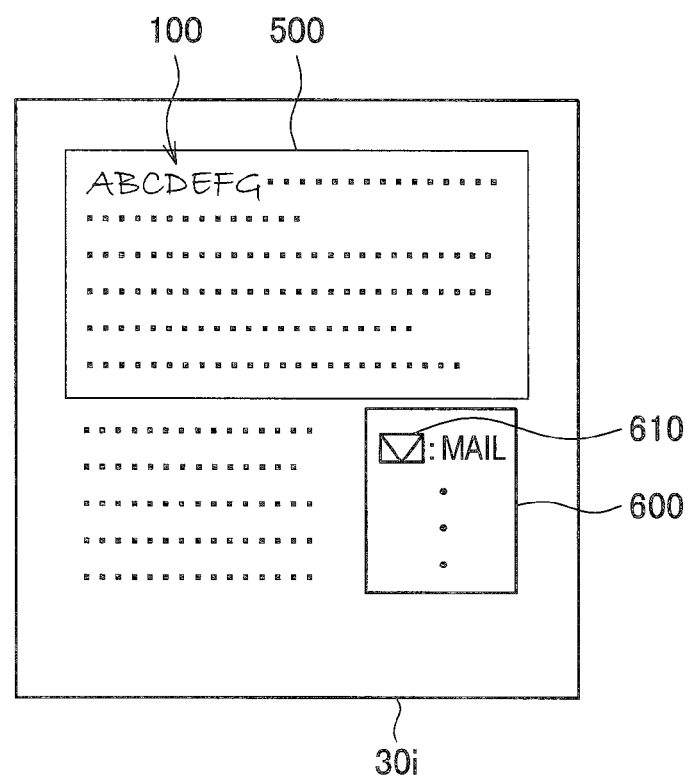
FIG. 39 is an explanatory diagram illustrating an example of a screen displayed by the information processing system.

Here, a specific example of the command correspondence processing will be described with reference to FIG. 39. As illustrated in FIG. 39, the control unit 30*e* enlarges and displays the handwriting action trajectory group (handwriting action trajectory 100). Then, the user selects stroke information (combination thereof) 500 among the handwriting action trajectory groups. In response to this, the control unit 30*e* displays the stroke information 500 in a form (for example, inversion, discoloration, flashing, or the like) capable of distinguishing from other stroke information. Then, the control unit 30*e* displays a list 600 of commands that can be associated with the stroke information. Icons 610 of the commands are listed in the list 600. Also, the respective names of the commands associated with the icons 610 are displayed in the respective icons 610. It is obvious that the example of the list is not limited thereto. Then, the control unit 30*e* associates the command selected by the user with the stroke information 500.

Figure 40:
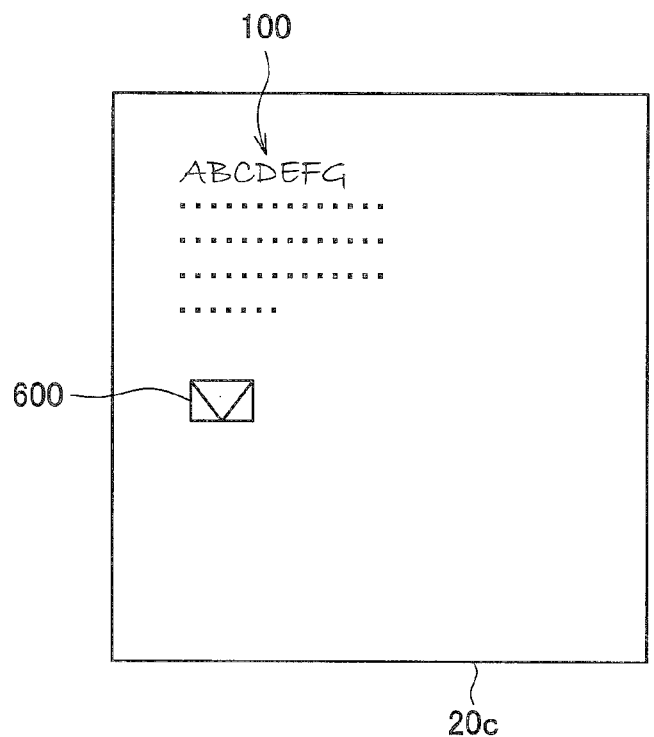
FIG. 40 is an explanatory diagram illustrating an example of a screen displayed by the information processing system.

Here, the user can previously select the command at the time of the handwriting action. That example will be described with reference to FIG. 40. As illustrated in FIGS. 2 and 40, the user inputs the handwriting action trajectory 100 (handwriting action trajectory group) by using the writing implement 25. Furthermore, in a case where a "send mail" command is desired to be associated with the handwriting action trajectory 100, the user draws the handwriting action trajectory 600. The handwriting action trajectory 600 indicates a mail envelope. The user may input all information (for example, mail address of a transmission destination or the like) necessary for "send mail" in the vicinity of the handwriting action trajectory 600 by the handwriting action.

Then, in the processing of step S440, the control unit 30*e* recognizes the handwriting action trajectory 600 and specifies the command associated with the handwriting action trajectory 600. At this time, the control unit 30*e* may feed back to the user that the command associated with the handwriting action trajectory 600 can be specified. Examples of the feedback method may include a method of displaying an alarm and converting the handwriting action trajectory 600 into an icon 610. Then, the control unit 30*e* associates the specified command with the handwriting action trajectory 100. Therefore, the user can easily associate the command as the user desires with the handwriting action trajectory 100. The handwriting action trajectory 600 may or may not be recognized as a type of stroke information.

In a case where the handwriting action trajectory management apparatus 30 performs the present processing, the handwriting action trajectory management apparatus 30 may be an information processing apparatus including a head-mounted display or a projection type display. In a case where the handwriting action trajectory management apparatus 30 includes the head-mounted display, the user performs the handwriting action while wearing the head-mounted display. Then, the control unit 30*e* recognizes the handwriting action trajectory 600 and performs feedback on the head-mounted display. For example, the handwriting action trajectory 600 is converted into an icon 610. In this way, the user can confirm that the corresponding handwriting action trajectory 600 has been recognized.

On the other hand, in a case where the handwriting action trajectory management apparatus 30 is the projection type display, the handwriting action trajectory management apparatus 30 may project a display image in vicinity of the user who performs the handwriting action. The control unit 30*e* displays the handwriting action trajectory 100 input by the user on a projection screen. Therefore, the user can recognize the result of the handwriting action on the projection screen while performing the handwriting action. Furthermore, the control unit 30*e* can recognize the handwriting action trajectory 600 and feed the result back on the projection screen. For example, the control unit 30*e* can convert the handwriting action trajectory 600 into the icon 610 on the projection screen. Therefore, the user can easily confirm that the handwriting action trajectory 600 has been recognized.

(2-6. Command Execution Processing)

Figure 25:
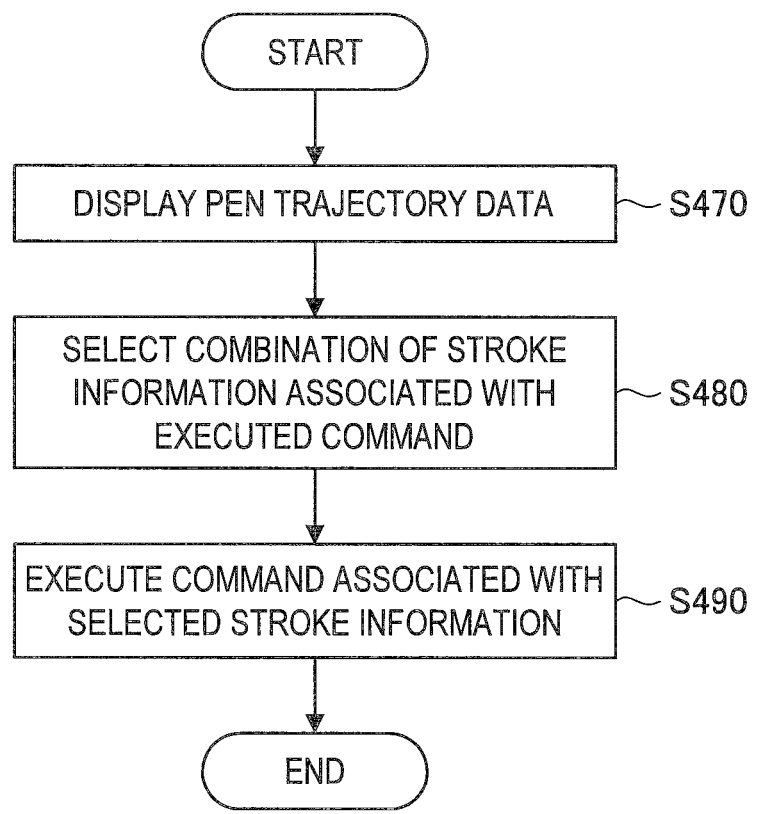
FIG. 25 is a flowchart illustrating a procedure of processing by an information processing system.

Next, command execution processing as a specific example of the application will be described with reference to a flowchart illustrated in FIG. 25.

In step S470, the control unit 30*e* rearranges the displayed stroke information on a time axis in units of handwriting action trajectory groups. Then, the control unit 30*e* enlarges and displays the handwriting action trajectory group whose record time (start time of the meta information) is early.

Then, the control unit 30e displays the stroke information associated with the command in a display format capable of distinguishing from other stroke information. Also, the control unit 30e displays the command associated with the stroke information in an icon form or like in the vicinity of the corresponding stroke information. The display format may be different according to commands. Then, the control unit 30e may sequentially perform processing subsequent to step S480 from the enlarged and displayed handwriting action trajectory group.

In step S480, the user directly selects desired stroke information from the enlarged and displayed stroke information. For example, the user drags the desired stroke information with his or her finger. Here, the user selects a combination of two or more pieces of stroke information. The control unit 30e displays the stroke information selected by the user in a format capable of distinguishing from other stroke information.

In step S490, the control unit 30e specifies the command associated with the stroke information selected by the user and displays various UIs necessary for executing the specified command (for example, an icon indicating the type of the command, an input box for receiving input information necessary for executing the command from the user, and the like). Then, the control unit 30e executes the command based on the information input by the user. In a case where the user selects another stroke information, the control unit 30e repeats processing subsequent to step S480. After that, the user performs a group switching action (for example, flick action). In response to this, the control unit 30e enlarges and displays another handwriting action trajectory group and performs processing subsequent to step S480. After that, the control unit 30e ends the present processing.

Figure 41:
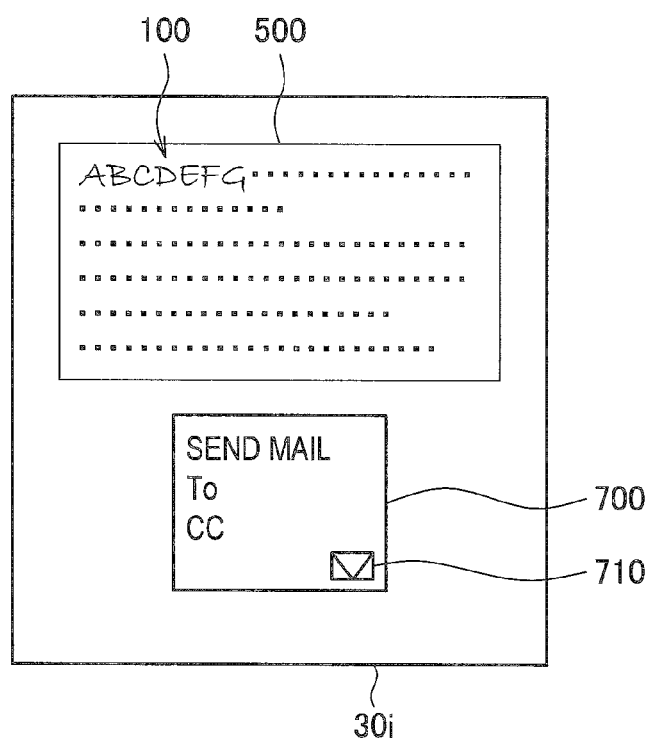
FIG. 41 is an explanatory diagram illustrating an example of a screen displayed by the information processing system.

Here, a specific example of the command execution processing will be described with reference to FIG. 41. As illustrated in FIG. 41, the control unit 30e enlarges and displays the handwriting action trajectory group (handwriting action trajectory 100). Also, a "send mail" command is previously associated with the stroke information (combination thereof) 500, and the control unit 30e displays the stroke information 500 in a display format capable of distinguishing from other stroke information.

Then, the user selects stroke information 500 among the handwriting action trajectory groups. In response to this, the control unit 30e displays a UI necessary for executing the "send mail" command, that is, a box 700. An icon 710 indicating the "send mail" command, an address input field, and the like are displayed in the mail box 700. The icon 710 is also used as an execution button. The user inputs an address of a mail destination in the address input field and taps the execution button or the icon 710. In response to this, the control unit 30e executes the "send mail" command. Specifically, the control unit 30e sends a mail, in which text information associated with the stroke information 500 is a mail text, to the mail destination.

(2-7. ID Imparting Processing)

Figure 26:
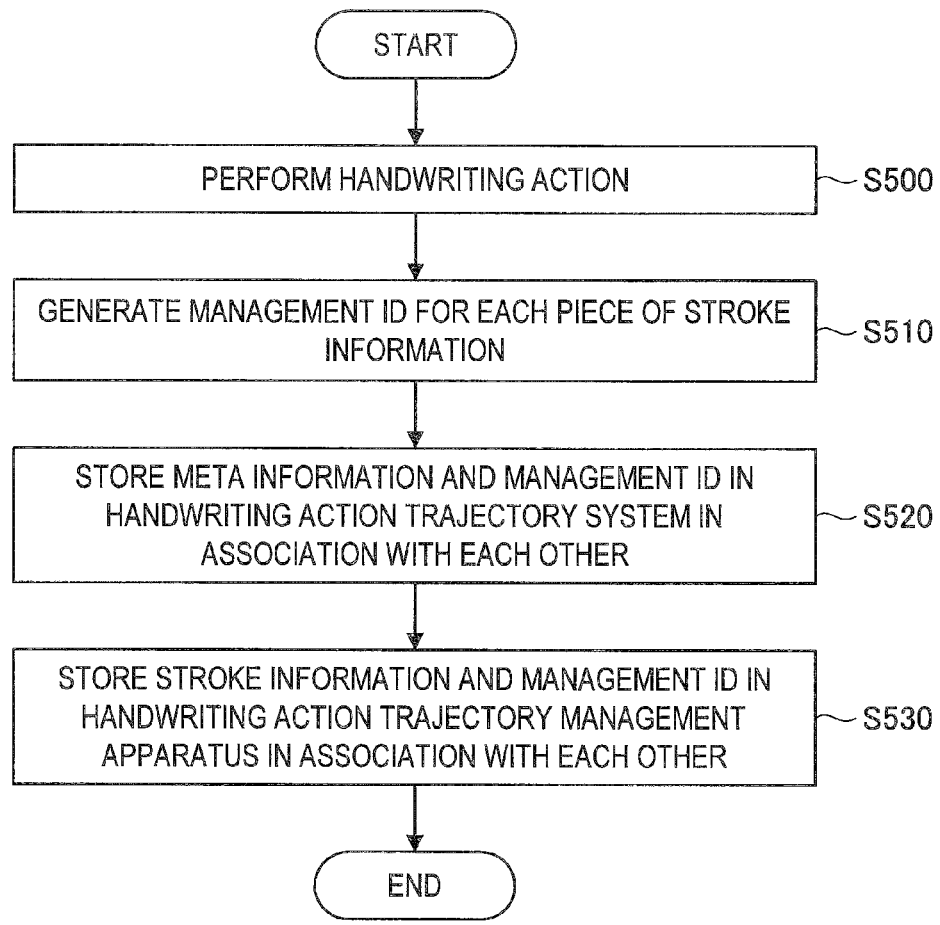
FIG. 26 is a flowchart illustrating a procedure of processing by an information processing system.

Next, ID imparting processing will be described with reference to a flowchart illustrated in FIG. 26. In step S500, the user performs the handwriting action by using the writing implement 25. The input unit 20b detects the handwriting action trajectory drawn by the user's handwriting action and outputs the handwriting action trajectory information about the handwriting action trajectory to the control unit 20e.

In step S510, the control unit 20e divides the handwriting action trajectory into one or more strokes. The control unit 20e imparts meta information to stroke information indicating the respective strokes. Furthermore, the control unit 20e generates a handwriting action trajectory group by grouping stroke information. The control unit 20e may set one handwriting action trajectory group as one-page stroke information. The control unit 20e imparts meta information to the handwriting action trajectory group.

Furthermore, the control unit 20e generates an integrated ID for each piece of the stroke information. The integrated ID is different according to stroke information. Therefore, the integrated ID uniquely specifies the stroke information. Also, the control unit 20e also generates an integrated ID for each handwriting action trajectory group.

In step S520, the control unit 20e imparts the same integrated ID to the stroke information and the meta information associated with the stroke information. Similarly, the control unit 20e imparts the same integrated ID to the handwriting action trajectory group and the meta information associated with the handwriting action trajectory group. Then, the control unit 20e stores the meta information and the integrated ID in the storage unit 20a. Furthermore, the control unit 20e outputs the stroke information, the handwriting action trajectory group, and the integrated ID imparted thereto to the communication unit 20d. The communication unit 20d transmits such information to the handwriting action trajectory management apparatus 30.

In step S530, the communication unit 30d of the handwriting action trajectory management apparatus 30 receives such information and outputs the received information to the control unit 30e. The control unit 30e stores such information in the storage unit 30a. Furthermore, the control unit 30e stores the stroke information, the handwriting action trajectory group, and the integrated ID imparted thereto in association with one another. Therefore, since the information processing system 1 stores the handwriting action trajectory information (stroke information, handwriting action trajectory group) and the meta information in separate storages, the confidentiality of information can be improved.

The control unit 20e may store the stroke information, the handwriting action trajectory group, and the integrated ID imparted thereto in one of the first and second storages 31 and 32. Also, the control unit 20e may store the meta information and the integrated ID in the first storage 31 and store the stroke information, the handwriting action trajectory group, and the integrated ID imparted thereto in the second storage 32. In view of the confidentiality of information, it is preferable that the meta information be kept in the information processing apparatus 20.

(2-8. ID Collation (Integration) Processing)

Figure 27:
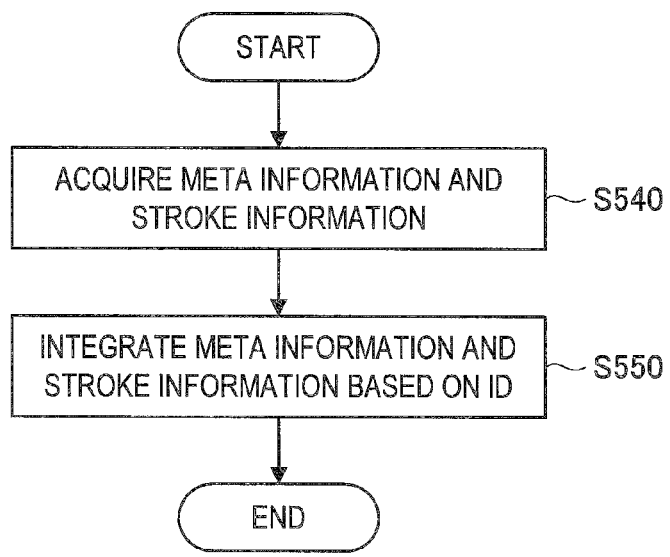
FIG. 27 is a flowchart illustrating a procedure of processing by an information processing system.

Next, ID collation processing will be described with reference to a flowchart illustrated in FIG. 27. In step S540, the control unit 20e outputs the meta information and the integrated ID imparted to the meta information to the communication unit 20d. The communication unit 20d transmits the meta information and the integrated ID to the handwriting action trajectory management apparatus 30. The communication unit 30d of the handwriting action trajectory management apparatus 30 receives such information and outputs the received information to the control unit 30e. The control unit 30e reads the stroke information and the handwriting action trajectory group from the storage unit 30a by using the integrated ID imparted thereto.

In step S550, the control unit 30e integrates the stroke information, the handwriting action trajectory group, and the meta information, based on the integrated ID. After that, the control unit 30e executes the above-described processing.

The present embodiment may be applied to, for example, a note/memo, a sketchbook, a manuscript paper, a letter/ postcard, an album, a book (comics/magazine, etc.), a newspaper, a poster/advertisement flier, an origami paper/paper work, an account ledger (paper for special work/standard paper), and the like. For example, in a case where the user draws a handwriting action trajectory on such objects, the above-described processing may be performed.

Therefore, according to the present embodiment, the meta information can be imparted to the handwriting action trajectory information. Therefore, the information processing system 1 can apply the handwriting action trajectory to a variety of processing. For example, the information processing system 1 can perform a variety of processing, such as searching, reproduction, and correction of the handwriting action trajectory information, association of commands, and the like, based on the meta information.

In particular, in the present embodiment, since the meta information is information that can be detected from an actual environment where the user's handwriting action is performed, processing of reflecting an actual environment can be performed. For example, the user can think an actual environment when performing a handwriting action, set the actual environment as the detection information, and easily search desired handwriting action trajectory information.

Also, since the information processing system 1 associates the meta information with the stroke information constituting the handwriting action trajectory information, processing can be performed in more detail based on the meta information. For example, the information processing system 1 can perform reproduction with respect to each piece of stroke information.

Also, the information processing system 1 generates the handwriting action trajectory group by grouping a plurality of pieces of stroke information, and associates the meta information with the handwriting action trajectory group. Therefore, the information processing system 1 can perform processing for the stroke information in a batch with respect to each group.

Furthermore, the information processing system 1 associates different pieces of meta information with the stroke information and the handwriting action trajectory group. For example, since the stroke information is included in the handwriting action trajectory group, most meta information may be imparted to the handwriting action trajectory group, and only simple meta information (time information or the like) may be imparted to the stroke information. Therefore, the information processing system 1 can perform different processing to the handwriting action trajectory group and the stroke information. For example, the information processing system 1 can search the handwriting action trajectory group and reproduce the stroke information in the handwriting action trajectory group, based on the meta information imparted to the handwriting action trajectory group. Also, the reduction of data can be performed.

Since time information about the time when the handwriting action is performed is included in the meta information, the information processing system 1 can perform processing based on the time information (for example, searching, reproduction, or the like).

In a case where the handwriting action trajectory indicates a character, since text information of the corresponding character is included in the meta information, the information processing system 1 can perform processing based on the text information (for example, searching, correction, or the like).

Since the user's biological information is included in the meta information, the information processing system 1 can perform processing based on the user's biological information (searching or the like).

Since geographic information about a position where the handwriting action is performed is included in the meta information, the information processing system 1 can perform processing based on the geographic information (searching or the like).

In a case where the user performs the handwriting action by using the writing implement, since writing pressure information of the writing implement is included in the meta information, the information processing system 1 can perform processing based on the writing pressure information (searching or the like).

In a case where the user performs the handwriting action by using the writing implement, since type information of the writing implement is included in the meta information, the information processing system 1 can perform processing based on the type information of the writing implement (searching or the like).

Since object information indicating the object of the handwriting action is included in the meta information, the information processing system 1 can perform processing based on the object information (searching or the like).

The information processing system 1 imparts the integrated ID (identification information) for associating the handwriting action trajectory information with the meta information to the handwriting action trajectory information and the meta information and stores the handwriting action trajectory information and the meta information in separate storage devices. Therefore, the information processing system 1 can improve the confidentiality of the handwriting action trajectory information and the meta information, in particular, the meta information.

In a case where the time information is included in the meta information, since the information processing system 1 reproduces the handwriting action trajectory information based on the time information, the user can easily confirm the handwriting action trajectory written by himself or herself.

Since the information processing system 1 receives the correction action of the handwriting action trajectory information, the user can easily correct the handwriting action trajectory written by himself or herself. At this time, since the information processing system 1 displays sample information (text information corresponding to the handwriting action trajectory information), the user can correct the handwriting action trajectory information with reference to the sample information.

In a case where the command information indicating the processing contents corresponding to the handwriting action trajectory information is included in the handwriting action trajectory information, the information processing system 1 performs processing of the handwriting action trajectory information based on the command information. Therefore, the user can easily execute the desired command to the information processing system 1. The above-described effects are merely exemplary, and the present embodiment may have any of the effects described in the present specification or other effects.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing system including:
a first control unit configured to associate handwriting action trajectory information indicating a user's handwriting action trajectory with meta information capable of being detected from an actual environment where the user's handwriting action is performed.
(2) The information processing system according to (1), wherein the first control unit associates the meta information with each piece of unit trajectory information constituting the handwriting action trajectory information.
(3) The information processing system according to (2), wherein the first control unit generates a handwriting action trajectory group by grouping pieces of unit trajectory information, and associates the meta information with the handwriting action trajectory group.
(4) The information processing system according to (3), wherein the first control unit associates different pieces of meta information with the unit trajectory information and the handwriting action trajectory group.
(5) The information processing system according to any one of (1) to (4), wherein the first control unit includes time information about time when the handwriting action is performed, in the meta information.
(6) The information processing system according to any one of (1) to (5), wherein, when the handwriting action trajectory indicates a character, the first control unit includes text information of the character in the meta information.
(7) The information processing system according to any one of (1) to (6), wherein the first control unit includes a user's biological information in the meta information.
(8) The information processing system according to any one of (1) to (7), wherein the first control unit includes geographic information about a position where the handwriting action is performed, in the meta information.
(9) The information processing system according to any one of (1) to (8), wherein, when a user performs the handwriting action by using a writing implement, the first control unit includes writing pressure information of the writing implement in the meta information.
(10) The information processing system according to any one of (1) to (9), wherein, when a user performs the handwriting action by using a writing implement, the first control unit includes type information of the writing implement in the meta information.
(11) The information processing system according to any one of (1) to (10), wherein the first control unit includes object information indicating an object of the handwriting action, in the meta information.
(12) The information processing system according to any one of (1) to (11), wherein the first control units imparts identification information for associating the handwriting action trajectory information with the meta information to the handwriting action trajectory information and the meta information and stores the handwriting action trajectory information and the meta information in separate storage devices.
(13) The information processing system according to any one of (1) to (12), further including:
a second control unit configured to perform processing corresponding to the handwriting action trajectory information based on the meta information.
(14) The information processing system according to (13), wherein, when time information about time when the handwriting action is performed is included in the meta information, the second control unit reproduces the handwriting action trajectory information based on the time information.
(15) The information processing system according to (13) or (14), wherein the second control unit displays the handwriting action trajectory information and receives a correction action for the displayed handwriting action trajectory information, based on the meta information,
(16) The information processing system according to (15), wherein the second control unit provides sample information as a sample of the handwriting action trajectory information.
(17) The information processing system according to any one of (13) to (16), wherein, when command information indicating processing contents corresponding to the handwriting action trajectory information is included in the handwriting action trajectory information, the second control unit performs processing of the handwriting action trajectory information based on the command information.
(18) An information processing method including:
associating handwriting action trajectory information indicating a user's handwriting action trajectory with meta information capable of being detected from an actual environment where the user's handwriting action is performed.
(19) A program for causing a computer to execute:
a first control function of associating handwriting action trajectory information indicating a user's handwriting action trajectory with meta information capable of being detected from an actual environment where the user's handwriting action is performed.

What is claimed is:
1. An information processing system, comprising:
a Central Processing Unit (CPU) configured to:
detect a handwriting action trajectory of a user based on one of a touch screen input or a captured image;
associate handwriting action trajectory information indicating the handwriting action trajectory with a plurality of pieces of meta information;
store the handwriting action trajectory information, the plurality of pieces of meta information, and a command associated with the handwriting action trajectory information;
select one of the plurality of pieces of meta information based on a user operation;
retrieve the stored handwriting action trajectory information based on the selected one of plurality of pieces of meta information; and
execute the command based on the retrieved handwriting action trajectory information.
2. The information processing system according to claim 1, wherein the CPU is further configured to associate the plurality of pieces of meta information with each of a plurality of pieces of unit trajectory information constituting the handwriting action trajectory information.
3. The information processing system according to claim 2, wherein the CPU is further configured to:
group the plurality of pieces of unit trajectory information that indicates the handwriting action trajectory drawn within a time period to generate a handwriting action trajectory group; and
associate the plurality of pieces of meta information with the handwriting action trajectory group.
4. The information processing system according to claim 1, wherein the plurality of pieces of meta information comprises time information associated with time based on the detection of the handwriting action trajectory.
5. The information processing system according to claim 1, wherein, the CPU is further configured to include text information of a character in the plurality of pieces of meta information based on an indication of the character by the handwriting action trajectory.

6. The information processing system according to claim 1, wherein the plurality of pieces of meta information comprises biological information of the user.

7. The information processing system according to claim 1, wherein the plurality of pieces of meta information comprises geographic information of a position where the handwriting action trajectory is detected, and wherein the geographic information is detected from a sensor.

8. The information processing system according to claim 1, wherein, the CPU is further configured to include writing pressure information of a writing implement in the plurality of pieces of meta information based on execution of a handwriting action with the writing implement.

9. The information processing system according to claim 1, wherein, the CPU is further configured to include type information of a writing implement in the plurality of pieces of meta information based on execution of a handwriting action with the writing implement.

10. The information processing system according to claim 1, wherein the plurality of pieces of meta information comprises object information indicating a base material on which the handwriting action trajectory is drawn.

11. The information processing system according to claim 1, wherein the CPU is further configured to:
generate identification information for each piece of unit trajectory information, wherein the identification information associates the handwriting action trajectory information with the plurality of pieces of meta information; and
store the handwriting action trajectory information in a first storage device and the plurality of pieces of meta information in a second storage device.

12. The information processing system according to claim 1, wherein the CPU is further configured to process the handwriting action trajectory information based on the plurality of pieces of meta information.

13. The information processing system according to claim 12, wherein, the CPU is further configured to reproduce the handwriting action trajectory information based on time information included in the plurality of pieces of meta information.

14. The information processing system according to claim 12, wherein the CPU is further configured to:
control a display unit to display the handwriting action trajectory information;
receive a correction action for the displayed handwriting action trajectory information, based on the plurality of pieces meta information; and
execute the correction action.

15. The information processing system according to claim 14, wherein the CPU is further configured to control the display unit to display sample information of the handwriting action trajectory information.

16. The information processing system according to claim 12, wherein, the CPU is further configured to process the handwriting action trajectory information based on the command associated with the handwriting action trajectory information, wherein the command indicates processing content that corresponds to the handwriting action trajectory information.

17. An information processing method, comprising:
detecting a handwriting action trajectory of a user based on one of a touch screen input or a captured image;
associating handwriting action trajectory information indicating the handwriting action trajectory with a plurality of pieces of meta information;
storing the handwriting action trajectory information, the plurality of pieces of meta information, and a command associated with the handwriting action trajectory information;
selecting one of the plurality of pieces of meta information based on a user operation;
retrieving the stored handwriting action trajectory information based on the selected one of plurality of pieces of meta information; and
executing the command based on the retrieved handwriting action trajectory information.

18. A non-transitory computer-readable medium having stored thereon, computer-executable instructions, which when executed by a computer, cause the computer to execute operations, the operations comprising:
detecting a handwriting action trajectory based on one of a touch screen input or a captured image;
associating handwriting action trajectory information indicating the handwriting action trajectory with a plurality of pieces of meta information;
storing the handwriting action trajectory information, the plurality of pieces of meta information, and a command associated with the handwriting action trajectory information;
selecting one of the plurality of pieces of meta information based on a user operation;
retrieving the stored handwriting action trajectory information based on the selected one of plurality of pieces of meta information; and
executing the command based on the retrieved handwriting action trajectory information.

19. The information processing system according to claim 5, wherein the text information of the character is associated as the meta information in each piece of unit trajectory information constituting the handwriting action trajectory information.

20. The information processing system according to claim 1, wherein the information processing system is a cloud computing system.

* * * * *